US011433346B2

(12) United States Patent
Wang et al.

(10) Patent No.: US 11,433,346 B2
(45) Date of Patent: Sep. 6, 2022

(54) DEHYDRATION PROCESSES UTILIZING CATIONIC ZEOLITE RHO

(71) Applicant: ExxonMobil Upstream Research Company, Spring, TX (US)

(72) Inventors: Yu Wang, Lebannon, NJ (US); Barbara Carstensen, Annandale, NJ (US); Daniel P. Leta, Flemington, NJ (US); Peter I. Ravikovitch, Princeton, NJ (US); Harry W. Deckman, Clinton, NJ (US); Scott J. Weigel, Allentown, PA (US)

(73) Assignee: ExxonMobil Upstream Research Company, Spring, TX (US)

( * ) Notice: Subject to any disclaimer, the term of this patent is extended or adjusted under 35 U.S.C. 154(b) by 122 days.

(21) Appl. No.: 17/070,465

(22) Filed: Oct. 14, 2020

(65) Prior Publication Data

US 2021/0113952 A1   Apr. 22, 2021

Related U.S. Application Data

(60) Provisional application No. 62/915,993, filed on Oct. 16, 2019.

(51) Int. Cl.
*B01D 53/00* (2006.01)
*B01D 53/04* (2006.01)
(Continued)

(52) U.S. Cl.
CPC ..... *B01D 53/0462* (2013.01); *B01D 53/0423* (2013.01); *B01D 53/261* (2013.01);
(Continued)

(58) Field of Classification Search
CPC ...... B01D 2253/108; B01D 2253/1085; B01D 2253/1122; B01D 2256/22;
(Continued)

(56) References Cited

U.S. PATENT DOCUMENTS

| 1,868,138 A | 7/1932 | Fisk |
| 2,646,391 A | 7/1953 | Houdry |

(Continued)

FOREIGN PATENT DOCUMENTS

| CN | 102585953 | 7/2012 |
| CN | 105038881 | 11/2017 |

(Continued)

OTHER PUBLICATIONS

Agrafiotis, C. et al., "The effect of particle size on the adhesion properties of oxide washcoats on cordierite honeycombs," Journal of Materials Science Letters, 1999, vol. 18, pp. 1421-1424.

(Continued)

*Primary Examiner* — Sharon Pregler
(74) *Attorney, Agent, or Firm* — ExxonMobil Upstream Research Company—Law Department

(57) ABSTRACT

Disclosed are processes and systems for the removal of water from a feed stream utilizing swing adsorption processes including an adsorbent bed comprising an adsorbent material which is a cationic zeolite RHO. The cationic zeolite RHO comprises at least one, preferably two, metal cations selected from Group 1 and 2 elements (new Group 1-18 IUPAC numbering). The swing adsorption processes and systems utilizing the cationic zeolite RHO have an adsorption selectivity for water and are useful in selective dehydration of commercial feed streams. The cationic zeolite RHO additionally has an exceptionally high water adsorption stability for use in feed streams with wet acid gas environments operating under cyclic swing adsorption conditions.

30 Claims, 14 Drawing Sheets

(51) Int. Cl.
*B01D 53/26* (2006.01)
*B01J 20/18* (2006.01)

(52) U.S. Cl.
CPC ......... *B01J 20/18* (2013.01); *B01D 2253/108* (2013.01); *B01D 2253/1122* (2013.01); *B01D 2256/24* (2013.01); *B01D 2257/80* (2013.01)

(58) Field of Classification Search
CPC ............ B01D 2256/24; B01D 2257/80; B01D 53/04; B01D 53/0423; B01D 53/0462; B01D 53/0473; B01D 53/0476; B01D 53/261
See application file for complete search history.

(56) References Cited

U.S. PATENT DOCUMENTS

| | | |
|---|---|---|
| 3,103,425 A | 9/1963 | Meyer |
| 3,124,152 A | 3/1964 | Payne |
| 3,142,547 A | 7/1964 | Marsh et al. |
| 3,237,377 A | 3/1966 | Skarstrom |
| 3,508,758 A | 4/1970 | Strub |
| 3,594,983 A | 7/1971 | Yearout |
| 3,602,247 A | 8/1971 | Bunn et al. |
| 3,720,753 A | 3/1973 | Robson |
| 3,788,036 A | 1/1974 | Lee et al. |
| 3,967,464 A | 7/1976 | Cormier et al. |
| 4,187,092 A | 2/1980 | Woolley |
| 4,261,815 A | 4/1981 | Kelland |
| 4,324,565 A | 4/1982 | Benkmann |
| 4,325,565 A | 4/1982 | Winchell |
| 4,329,162 A | 5/1982 | Pitcher |
| 4,340,398 A | 7/1982 | Doshi et al. |
| 4,386,947 A | 6/1983 | Mizuno et al. |
| 4,421,531 A | 12/1983 | Dalton, Jr. et al. |
| 4,445,441 A | 5/1984 | Tanca |
| 4,461,630 A | 7/1984 | Cassidy et al. |
| 4,496,376 A | 1/1985 | Hradek |
| 4,559,065 A | 12/1985 | Null et al. |
| 4,631,073 A | 12/1986 | Null et al. |
| 4,693,730 A | 9/1987 | Miller et al. |
| 4,705,627 A | 11/1987 | Miwa et al. |
| 4,711,968 A | 12/1987 | Oswald et al. |
| 4,737,170 A | 4/1988 | Searle |
| 4,770,676 A | 9/1988 | Sircar et al. |
| 4,783,205 A | 11/1988 | Searle |
| 4,784,672 A | 11/1988 | Sircar |
| 4,790,272 A | 12/1988 | Woolenweber |
| 4,814,146 A | 3/1989 | Brand et al. |
| 4,816,039 A | 3/1989 | Krishnamurthy et al. |
| 4,877,429 A | 10/1989 | Hunter |
| 4,977,745 A | 12/1990 | Heichberger |
| 5,110,328 A | 5/1992 | Yokota et al. |
| 5,125,934 A | 6/1992 | Krishnamurthy et al. |
| 5,169,006 A | 12/1992 | Stelzer |
| 5,169,414 A | 12/1992 | Panzica et al. |
| 5,174,796 A | 12/1992 | Davis et al. |
| 5,224,350 A | 7/1993 | Mehra |
| 5,228,888 A | 7/1993 | Gmelin et al. |
| 5,234,472 A | 8/1993 | Krishnamurthy et al. |
| 5,292,990 A | 3/1994 | Kantner et al. |
| 5,306,331 A | 4/1994 | Auvil et al. |
| 5,354,346 A | 10/1994 | Kumar |
| 5,365,011 A | 11/1994 | Ramachandran et al. |
| 5,370,728 A | 12/1994 | LaSala et al. |
| 5,486,227 A | 1/1996 | Kumar et al. |
| 5,503,782 A | 4/1996 | Dyrud et al. |
| 5,547,641 A | 8/1996 | Smith et al. |
| 5,565,018 A | 10/1996 | Baksh et al. |
| 5,647,891 A | 7/1997 | Blizzard et al. |
| 5,669,962 A | 9/1997 | Dunne |
| 5,672,196 A | 9/1997 | Acharya et al. |
| 5,700,310 A | 12/1997 | Bowman et al. |
| 5,733,451 A | 3/1998 | Coellner et al. |
| 5,735,938 A | 4/1998 | Baksh et al. |
| 5,750,026 A | 5/1998 | Gadkaree et al. |
| 5,769,928 A | 6/1998 | Leavitt |
| 5,779,768 A | 7/1998 | Anand et al. |
| 5,792,239 A | 8/1998 | Reinhold, III et al. |
| 5,807,423 A | 9/1998 | Lemcoff et al. |
| 5,811,616 A | 9/1998 | Holub et al. |
| 5,827,358 A | 10/1998 | Kulish et al. |
| 5,827,577 A | 10/1998 | Spencer |
| 5,882,380 A | 3/1999 | Sircar |
| 5,906,673 A | 5/1999 | Reinhold, III et al. |
| 5,908,480 A | 6/1999 | Ban et al. |
| 5,912,426 A | 6/1999 | Smolarek et al. |
| 5,914,294 A | 6/1999 | Park et al. |
| 5,924,307 A | 7/1999 | Nenov |
| 5,935,444 A | 8/1999 | Johnson et al. |
| 5,951,744 A | 9/1999 | Rohrbach et al. |
| 5,968,234 A | 10/1999 | Midgett, II et al. |
| 5,976,221 A | 11/1999 | Bowman et al. |
| 5,997,617 A | 12/1999 | Czabala et al. |
| 6,007,606 A | 12/1999 | Baksh et al. |
| 6,011,192 A | 1/2000 | Baker et al. |
| 6,023,942 A | 2/2000 | Thomas et al. |
| 6,053,966 A | 4/2000 | Moreau et al. |
| 6,063,161 A | 5/2000 | Keefer et al. |
| 6,096,115 A | 8/2000 | Kleinberg |
| 6,099,621 A | 8/2000 | Ho |
| 6,102,985 A | 8/2000 | Naheiri et al. |
| 6,129,780 A | 10/2000 | Millet et al. |
| 6,136,222 A | 10/2000 | Friesen et al. |
| 6,147,126 A | 11/2000 | DeGeorge et al. |
| 6,152,991 A | 11/2000 | Ackley |
| 6,156,101 A | 12/2000 | Naheiri |
| 6,171,371 B1 | 1/2001 | Derive et al. |
| 6,176,897 B1 | 1/2001 | Keefer |
| 6,179,900 B1 | 1/2001 | Behling et al. |
| 6,183,538 B1 | 2/2001 | Naheiri |
| 6,194,079 B1 | 2/2001 | Hekal |
| 6,210,466 B1 | 4/2001 | Whysall et al. |
| 6,231,302 B1 | 5/2001 | Bonardi |
| 6,245,127 B1 | 6/2001 | Kane et al. |
| 6,284,021 B1 | 9/2001 | Lu et al. |
| 6,311,719 B1 | 11/2001 | Hill et al. |
| 6,345,954 B1 | 2/2002 | Al-Himyary et al. |
| 6,398,853 B1 | 6/2002 | Keefer et al. |
| 6,402,813 B2 | 6/2002 | Monereau et al. |
| 6,406,523 B1 | 6/2002 | Connor et al. |
| 6,425,938 B1 | 7/2002 | Xu et al. |
| 6,432,379 B1 | 8/2002 | Heung |
| 6,436,171 B1 | 8/2002 | Wang et al. |
| 6,444,012 B1 | 9/2002 | Dolan et al. |
| 6,444,014 B1 | 9/2002 | Mullhaupt et al. |
| 6,444,523 B1 | 9/2002 | Fan et al. |
| 6,444,610 B1 | 9/2002 | Yamamoto |
| 6,451,095 B1 | 9/2002 | Keefer et al. |
| 6,457,485 B2 | 10/2002 | Hill et al. |
| 6,458,187 B1 | 10/2002 | Fritz et al. |
| 6,464,761 B1 | 10/2002 | Bugli |
| 6,471,749 B1 | 10/2002 | Kawai et al. |
| 6,471,939 B1 | 10/2002 | Boix et al. |
| 6,488,747 B1 | 12/2002 | Keefer |
| 6,497,750 B2 | 12/2002 | Butwell et al. |
| 6,500,234 B1 | 12/2002 | Ackley et al. |
| 6,500,241 B2 | 12/2002 | Reddy |
| 6,500,404 B1 | 12/2002 | Camblor Fernandez et al. |
| 6,503,299 B2 | 1/2003 | Baksh et al. |
| 6,506,351 B1 | 1/2003 | Jain et al. |
| 6,514,318 B2 | 2/2003 | Keefer |
| 6,514,319 B2 | 2/2003 | Keefer et al. |
| 6,517,609 B1 | 2/2003 | Monereau et al. |
| 6,531,516 B2 | 3/2003 | Davis et al. |
| 6,533,846 B1 | 3/2003 | Keefer et al. |
| 6,565,627 B1 | 5/2003 | Golden et al. |
| 6,565,635 B2 | 5/2003 | Keefer et al. |
| 6,565,825 B2 | 5/2003 | Ohji et al. |
| 6,572,678 B1 | 6/2003 | Wijmans et al. |
| 6,579,341 B2 | 6/2003 | Baker et al. |
| 6,593,541 B1 | 7/2003 | Herren |
| 6,595,233 B2 | 7/2003 | Pulli |
| 6,605,136 B1 | 8/2003 | Graham et al. |
| 6,607,584 B2 | 8/2003 | Moreau et al. |

(56) References Cited

U.S. PATENT DOCUMENTS

| | | |
|---|---|---|
| 6,630,012 B2 | 10/2003 | Wegeng et al. |
| 6,631,626 B1 | 10/2003 | Hahn |
| 6,641,645 B1 | 11/2003 | Lee et al. |
| 6,651,645 B1 | 11/2003 | Nunez-Suarez |
| 6,660,064 B2 | 12/2003 | Golden et al. |
| 6,660,065 B2 | 12/2003 | Byrd et al. |
| 6,692,626 B2 | 2/2004 | Keefer et al. |
| 6,712,087 B2 | 3/2004 | Hill et al. |
| 6,742,507 B2 | 6/2004 | Keefer et al. |
| 6,746,515 B2 | 6/2004 | Wegeng et al. |
| 6,752,852 B1 | 6/2004 | Jacksier et al. |
| 6,770,120 B2 | 8/2004 | Neu et al. |
| 6,773,225 B2 | 8/2004 | Yuri et al. |
| 6,802,889 B2 | 10/2004 | Graham et al. |
| 6,814,771 B2 | 11/2004 | Scardino et al. |
| 6,835,354 B2 | 12/2004 | Woods et al. |
| 6,840,985 B2 | 1/2005 | Keefer |
| 6,866,950 B2 | 3/2005 | Connor et al. |
| 6,889,710 B2 | 5/2005 | Wagner |
| 6,890,376 B2 | 5/2005 | Arquin et al. |
| 6,893,483 B2 | 5/2005 | Golden et al. |
| 6,902,602 B2 | 6/2005 | Keefer et al. |
| 6,916,358 B2 | 7/2005 | Nakamura et al. |
| 6,918,953 B2 | 7/2005 | Lomax, Jr. et al. |
| 6,921,597 B2 | 7/2005 | Keefer et al. |
| 6,936,561 B2 | 8/2005 | Marques et al. |
| 6,974,496 B2 | 12/2005 | Wegeng et al. |
| 7,025,801 B2 | 4/2006 | Monereau |
| 7,027,929 B2 | 4/2006 | Wang |
| 7,029,521 B2 | 4/2006 | Johansson |
| 7,074,323 B2 | 7/2006 | Ghijsen |
| 7,077,891 B2 | 7/2006 | Jaffe et al. |
| 7,087,331 B2 | 8/2006 | Keefer et al. |
| 7,094,275 B2 | 8/2006 | Keefer et al. |
| 7,097,925 B2 | 8/2006 | Keefer et al. |
| 7,112,239 B2 | 9/2006 | Kimbara et al. |
| 7,117,669 B2 | 10/2006 | Kaboord et al. |
| 7,122,073 B1 | 10/2006 | Notaro et al. |
| 7,128,775 B2 | 10/2006 | Celik et al. |
| 7,144,016 B2 | 12/2006 | Gozdawa |
| 7,160,356 B2 | 1/2007 | Koros et al. |
| 7,160,367 B2 | 1/2007 | Babicki et al. |
| 7,166,149 B2 | 1/2007 | Dunne et al. |
| 7,169,212 B1 | 1/2007 | Corbin |
| 7,172,645 B1 | 2/2007 | Pfister et al. |
| 7,189,280 B2 | 3/2007 | Alizadeh-Khiavi et al. |
| 7,243,679 B2 | 7/2007 | Thelen |
| 7,250,073 B2 | 7/2007 | Keefer et al. |
| 7,250,074 B2 | 7/2007 | Tonkovich et al. |
| 7,255,727 B2 | 8/2007 | Monereau et al. |
| 7,258,725 B2 | 8/2007 | Ohmi et al. |
| 7,276,095 B2 | 10/2007 | Gittleman et al. |
| 7,276,107 B2 | 10/2007 | Baksh et al. |
| 7,279,029 B2 | 10/2007 | Occhialini et al. |
| 7,285,350 B2 | 10/2007 | Keefer et al. |
| 7,297,279 B2 | 11/2007 | Johnson et al. |
| 7,311,763 B2 | 12/2007 | Neary |
| RE40,006 E | 1/2008 | Keefer et al. |
| 7,314,503 B2 | 1/2008 | Landrum et al. |
| 7,354,562 B2 | 4/2008 | Ying et al. |
| 7,387,849 B2 | 6/2008 | Keefer et al. |
| 7,390,350 B2 | 6/2008 | Weist, Jr. et al. |
| 7,404,846 B2 | 7/2008 | Golden et al. |
| 7,438,079 B2 | 10/2008 | Cohen et al. |
| 7,449,049 B2 | 11/2008 | Thomas et al. |
| 7,456,131 B2 | 11/2008 | Klett et al. |
| 7,510,601 B2 | 3/2009 | Whitley et al. |
| 7,527,670 B2 | 5/2009 | Ackley et al. |
| 7,553,568 B2 | 6/2009 | Keefer |
| 7,560,154 B2 | 7/2009 | Katoh |
| 7,578,864 B2 | 8/2009 | Watanabe et al. |
| 7,604,682 B2 | 10/2009 | Seaton |
| 7,637,989 B2 | 12/2009 | Bong |
| 7,641,716 B2 | 1/2010 | Lomax, Jr. et al. |
| 7,645,324 B2 | 1/2010 | Rode et al. |
| 7,651,549 B2 | 1/2010 | Whitley |
| 7,674,319 B2 | 3/2010 | Lomax, Jr. et al. |
| 7,674,539 B2 | 3/2010 | Keefer et al. |
| 7,687,044 B2 | 3/2010 | Keefer et al. |
| 7,713,333 B2 | 5/2010 | Rege et al. |
| 7,717,981 B2 | 5/2010 | LaBuda et al. |
| 7,722,700 B2 | 5/2010 | Sprinkle |
| 7,731,782 B2 | 6/2010 | Kelley et al. |
| 7,740,687 B2 | 6/2010 | Reinhold, III |
| 7,744,676 B2 | 6/2010 | Leitmayr et al. |
| 7,744,677 B2 | 6/2010 | Barclay et al. |
| 7,758,051 B2 | 7/2010 | Roberts-Haritonov et al. |
| 7,758,988 B2 | 7/2010 | Keefer et al. |
| 7,763,098 B2 | 7/2010 | Alizadeh-Khiavi et al. |
| 7,763,099 B2 | 7/2010 | Verma et al. |
| 7,792,983 B2 | 9/2010 | Mishra et al. |
| 7,793,675 B2 | 9/2010 | Cohen et al. |
| 7,806,965 B2 | 10/2010 | Stinson |
| 7,819,948 B2 | 10/2010 | Wagner |
| 7,828,877 B2 | 11/2010 | Sawada et al. |
| 7,828,880 B2 | 11/2010 | Moriya et al. |
| 7,854,793 B2 | 12/2010 | Rarig et al. |
| 7,858,169 B2 | 12/2010 | Yamashita |
| 7,862,645 B2 | 1/2011 | Whitley et al. |
| 7,867,320 B2 | 1/2011 | Baksh et al. |
| 7,902,114 B2 | 3/2011 | Bowie et al. |
| 7,938,886 B2 | 5/2011 | Hershkowitz et al. |
| 7,947,118 B2 | 5/2011 | Rarig et al. |
| 7,947,120 B2 | 5/2011 | Deckman et al. |
| 7,959,720 B2 | 6/2011 | Deckman et al. |
| 8,016,918 B2 | 9/2011 | LaBuda et al. |
| 8,034,164 B2 | 10/2011 | Lomax, Jr. et al. |
| 8,071,063 B2 | 12/2011 | Reyes et al. |
| 8,128,734 B2 | 3/2012 | Song |
| 8,142,745 B2 | 3/2012 | Reyes et al. |
| 8,142,746 B2 | 3/2012 | Reyes et al. |
| 8,192,709 B2 | 6/2012 | Reyes et al. |
| 8,210,772 B2 | 7/2012 | Gillecriosd |
| 8,227,121 B2 | 7/2012 | Adams et al. |
| 8,262,773 B2 | 9/2012 | Northrop et al. |
| 8,262,783 B2 | 9/2012 | Stoner et al. |
| 8,268,043 B2 | 9/2012 | Celik et al. |
| 8,268,044 B2 | 9/2012 | Wright et al. |
| 8,272,401 B2 | 9/2012 | McLean |
| 8,287,629 B2 | 10/2012 | Fujita et al. |
| 8,319,090 B2 | 11/2012 | Kitamura |
| 8,337,594 B2 | 12/2012 | Corma Canos et al. |
| 8,361,200 B2 | 1/2013 | Sayari et al. |
| 8,361,205 B2 | 1/2013 | Desai et al. |
| 8,377,173 B2 | 2/2013 | Chuang |
| 8,444,750 B2 | 5/2013 | Deckman et al. |
| 8,449,649 B2 | 5/2013 | Greenough |
| 8,470,395 B2 | 6/2013 | Khiavi et al. |
| 8,476,180 B2 | 7/2013 | Hilaly et al. |
| 8,480,795 B2 | 7/2013 | Siskin et al. |
| 8,512,569 B2 | 8/2013 | Eaton et al. |
| 8,518,356 B2 | 8/2013 | Schaffer et al. |
| 8,529,662 B2 | 9/2013 | Kelley et al. |
| 8,529,663 B2 | 9/2013 | Reyes et al. |
| 8,529,664 B2 | 9/2013 | Deckman et al. |
| 8,529,665 B2 | 9/2013 | Manning et al. |
| 8,535,414 B2 | 9/2013 | Johnson et al. |
| 8,545,602 B2 | 10/2013 | Chance et al. |
| 8,551,444 B2 | 10/2013 | Agnihotri et al. |
| 8,573,124 B2 | 11/2013 | Havran et al. |
| 8,591,627 B2 | 11/2013 | Jain |
| 8,591,634 B2 | 11/2013 | Winchester et al. |
| 8,616,233 B2 | 12/2013 | McLean et al. |
| 8,657,922 B2 | 2/2014 | Yamawaki et al. |
| 8,673,059 B2 | 3/2014 | Leta et al. |
| 8,680,344 B2 | 3/2014 | Weston et al. |
| 8,715,617 B2 | 5/2014 | Genkin et al. |
| 8,741,243 B2 | 6/2014 | Gadkaree et al. |
| 8,752,390 B2 | 6/2014 | Wright et al. |
| 8,753,428 B2 | 6/2014 | Lomax, Jr. et al. |
| 8,778,051 B2 | 7/2014 | Weist, Jr. et al. |
| 8,784,533 B2 | 7/2014 | Leta et al. |
| 8,784,534 B2 | 7/2014 | Kamakoti et al. |
| 8,784,535 B2 | 7/2014 | Ravikovitch et al. |

(56) References Cited

U.S. PATENT DOCUMENTS

| | | |
|---|---|---|
| 8,790,618 B2 | 7/2014 | Adams et al. |
| 8,795,411 B2 | 8/2014 | Hufton |
| 8,808,425 B2 | 8/2014 | Genkin et al. |
| 8,808,426 B2 | 8/2014 | Sundaram |
| 8,814,985 B2 | 8/2014 | Gerds et al. |
| 8,852,322 B2 | 10/2014 | Gupta et al. |
| 8,858,683 B2 | 10/2014 | Deckman |
| 8,875,483 B2 | 11/2014 | Wettstein |
| 8,906,138 B2 | 12/2014 | Rasmussen et al. |
| 8,921,637 B2 | 12/2014 | Sundaram et al. |
| 8,932,386 B2 | 1/2015 | Bouvier et al. |
| 8,939,014 B2 | 1/2015 | Kamakoti et al. |
| 9,005,561 B2 | 4/2015 | Leta |
| 9,017,457 B2 | 4/2015 | Tammera |
| 9,028,595 B2 | 5/2015 | Sundaram et al. |
| 9,034,078 B2 | 5/2015 | Wanni et al. |
| 9,034,079 B2 | 5/2015 | Deckman et al. |
| 9,050,553 B2 | 6/2015 | Alizadeh-Khiavi et al. |
| 9,067,168 B2 | 6/2015 | Frederick et al. |
| 9,067,169 B2 | 6/2015 | Patel |
| 9,095,809 B2 | 8/2015 | Deckman et al. |
| 9,108,145 B2 | 8/2015 | Kalbassi et al. |
| 9,120,049 B2 | 9/2015 | Sundaram et al. |
| 9,126,138 B2 | 9/2015 | Deckman et al. |
| 9,162,175 B2 | 10/2015 | Sundaram |
| 9,168,483 B2 | 10/2015 | Ravikovitch et al. |
| 9,168,485 B2 | 10/2015 | Deckman et al. |
| 9,272,264 B2 | 3/2016 | Coupland |
| 9,278,338 B2 | 3/2016 | Coupland |
| 9,358,493 B2 | 6/2016 | Tammera et al. |
| 9,573,116 B2 | 2/2017 | Johnson et al. |
| 9,597,655 B2 | 3/2017 | Beeckman |
| 9,713,787 B2 | 7/2017 | Owens et al. |
| 9,737,846 B2 | 8/2017 | Carstensen et al. |
| 9,744,521 B2 | 8/2017 | Brody et al. |
| 10,040,022 B2 | 8/2018 | Fowler et al. |
| 10,080,991 B2 | 9/2018 | Johnson et al. |
| 10,080,992 B2 | 9/2018 | Nagavarapu et al. |
| 10,124,286 B2 | 11/2018 | McMahon et al. |
| 10,343,139 B2 * | 7/2019 | Bhadra .................. B01J 20/18 |
| 10,882,002 B2 | 1/2021 | Vittenet |
| 2001/0047824 A1 | 12/2001 | Hill et al. |
| 2002/0053547 A1 | 5/2002 | Schlegel et al. |
| 2002/0124885 A1 | 9/2002 | Hill et al. |
| 2002/0162452 A1 | 11/2002 | Butwell et al. |
| 2003/0075485 A1 | 4/2003 | Ghijsen |
| 2003/0129101 A1 | 7/2003 | Zettel |
| 2003/0131728 A1 | 7/2003 | Kanazirev et al. |
| 2003/0145726 A1 | 8/2003 | Gueret et al. |
| 2003/0170527 A1 | 9/2003 | Finn et al. |
| 2003/0188635 A1 | 10/2003 | Lomax, Jr. et al. |
| 2003/0202918 A1 | 10/2003 | Ashida et al. |
| 2003/0205130 A1 | 11/2003 | Neu et al. |
| 2003/0223856 A1 | 12/2003 | Yuri et al. |
| 2004/0099142 A1 | 5/2004 | Arquin et al. |
| 2004/0118277 A1 | 6/2004 | Kim |
| 2004/0118747 A1 | 6/2004 | Cutler et al. |
| 2004/0197596 A1 | 10/2004 | Connor et al. |
| 2004/0232622 A1 | 11/2004 | Gozdawa |
| 2005/0045041 A1 | 3/2005 | Hechinger et al. |
| 2005/0109419 A1 | 5/2005 | Ohmi et al. |
| 2005/0114032 A1 | 5/2005 | Wang |
| 2005/0129952 A1 | 6/2005 | Sawada et al. |
| 2005/0145111 A1 | 7/2005 | Keefer et al. |
| 2005/0150378 A1 | 7/2005 | Dunne et al. |
| 2005/0229782 A1 | 10/2005 | Monereau et al. |
| 2005/0252378 A1 | 11/2005 | Celik et al. |
| 2006/0017940 A1 | 1/2006 | Takayama |
| 2006/0048648 A1 | 3/2006 | Gibbs et al. |
| 2006/0049102 A1 | 3/2006 | Miller et al. |
| 2006/0076270 A1 | 4/2006 | Poshusta et al. |
| 2006/0099096 A1 | 5/2006 | Shaffer et al. |
| 2006/0105158 A1 | 5/2006 | Fritz et al. |
| 2006/0116430 A1 | 6/2006 | Wentink et al. |
| 2006/0116460 A1 | 6/2006 | Georget et al. |
| 2006/0162556 A1 | 7/2006 | Ackley et al. |
| 2006/0165574 A1 | 7/2006 | Sayari |
| 2006/0169142 A1 | 8/2006 | Rode et al. |
| 2006/0236862 A1 | 10/2006 | Golden et al. |
| 2006/0236867 A1 | 10/2006 | Neary |
| 2007/0084241 A1 | 4/2007 | Kretchmer et al. |
| 2007/0084344 A1 | 4/2007 | Moriya et al. |
| 2007/0187029 A1 | 8/2007 | Axtell et al. |
| 2007/0222160 A1 | 9/2007 | Roberts-Haritonov et al. |
| 2007/0253872 A1 | 11/2007 | Keefer et al. |
| 2007/0261550 A1 | 11/2007 | Ota |
| 2007/0261557 A1 | 11/2007 | Gadkaree et al. |
| 2007/0283807 A1 | 12/2007 | Whitley |
| 2008/0051279 A1 | 2/2008 | Klett et al. |
| 2008/0072822 A1 | 3/2008 | White |
| 2008/0128655 A1 | 6/2008 | Garg et al. |
| 2008/0202336 A1 | 8/2008 | Hofer et al. |
| 2008/0236389 A1 | 10/2008 | Leedy et al. |
| 2008/0282883 A1 | 11/2008 | Rarig et al. |
| 2008/0282884 A1 | 11/2008 | Kelley et al. |
| 2008/0282885 A1 | 11/2008 | Deckman et al. |
| 2008/0282886 A1 | 11/2008 | Reyes et al. |
| 2008/0282887 A1 | 11/2008 | Chance |
| 2008/0282892 A1 | 11/2008 | Deckman et al. |
| 2008/0289497 A1 | 11/2008 | Barclay et al. |
| 2008/0307966 A1 | 12/2008 | Stinson |
| 2008/0314550 A1 | 12/2008 | Greco |
| 2009/0004073 A1 | 1/2009 | Gleize et al. |
| 2009/0014902 A1 | 1/2009 | Koivunen et al. |
| 2009/0025553 A1 | 1/2009 | Keefer et al. |
| 2009/0025555 A1 | 1/2009 | Lively et al. |
| 2009/0037550 A1 | 2/2009 | Mishra et al. |
| 2009/0071333 A1 | 3/2009 | LaBuda et al. |
| 2009/0079870 A1 | 3/2009 | Matsui |
| 2009/0107332 A1 | 4/2009 | Wagner |
| 2009/0151559 A1 | 6/2009 | Verma et al. |
| 2009/0162268 A1 | 6/2009 | Hufton et al. |
| 2009/0180423 A1 | 7/2009 | Kroener |
| 2009/0241771 A1 | 10/2009 | Manning et al. |
| 2009/0284013 A1 | 11/2009 | Anand et al. |
| 2009/0294366 A1 | 12/2009 | Wright et al. |
| 2009/0308248 A1 | 12/2009 | Siskin et al. |
| 2009/0314159 A1 | 12/2009 | Haggerty |
| 2010/0059701 A1 | 3/2010 | McLean |
| 2010/0132254 A1 | 3/2010 | Wegerer et al. |
| 2010/0077920 A1 | 4/2010 | Baksh et al. |
| 2010/0089241 A1 | 4/2010 | Stoner et al. |
| 2010/0132548 A1 | 6/2010 | Dunne et al. |
| 2010/0137657 A1 | 6/2010 | Wegerer et al. |
| 2010/0186445 A1 | 7/2010 | Minta et al. |
| 2010/0212493 A1 | 8/2010 | Rasmussen et al. |
| 2010/0251887 A1 | 10/2010 | Jain |
| 2010/0252497 A1 | 10/2010 | Ellison et al. |
| 2010/0263534 A1 | 10/2010 | Chuang |
| 2010/0282593 A1 | 11/2010 | Speirs et al. |
| 2010/0288704 A1 | 11/2010 | Amsden et al. |
| 2011/0011803 A1 | 1/2011 | Koros |
| 2011/0020202 A1 | 1/2011 | Gadkaree et al. |
| 2011/0031103 A1 | 2/2011 | Deckman et al. |
| 2011/0067440 A1 | 3/2011 | Van Aken |
| 2011/0067770 A1 | 3/2011 | Pederson et al. |
| 2011/0123878 A1 | 5/2011 | Jangbarwala |
| 2011/0146494 A1 | 6/2011 | Desai et al. |
| 2011/0149640 A1 | 6/2011 | Furuta et al. |
| 2011/0217218 A1 | 9/2011 | Gupta et al. |
| 2011/0277620 A1 | 11/2011 | Havran et al. |
| 2011/0291051 A1 | 12/2011 | Hershkowitz et al. |
| 2011/0296871 A1 | 12/2011 | Van Soest-Vercammen et al. |
| 2011/0308524 A1 | 12/2011 | Brey et al. |
| 2012/0024150 A1 | 2/2012 | Moniot |
| 2012/0024152 A1 | 2/2012 | Yamawaki et al. |
| 2012/0031144 A1 | 2/2012 | Northrop et al. |
| 2012/0067216 A1 | 3/2012 | Corma-Canos et al. |
| 2012/0118755 A1 | 5/2012 | Dadvand et al. |
| 2012/0118758 A1 | 5/2012 | Ellis et al. |
| 2012/0152115 A1 | 6/2012 | Gerds et al. |
| 2012/0222551 A1 | 9/2012 | Deckman |
| 2012/0222552 A1 | 9/2012 | Ravikovitch et al. |
| 2012/0222553 A1 | 9/2012 | Kamakoti et al. |

(56) References Cited

U.S. PATENT DOCUMENTS

| | | |
|---|---|---|
| 2012/0222554 A1 | 9/2012 | Leta et al. |
| 2012/0222555 A1 | 9/2012 | Gupta et al. |
| 2012/0227583 A1 | 9/2012 | Monereau et al. |
| 2012/0255377 A1 | 10/2012 | Kamakoti et al. |
| 2012/0272823 A1 | 11/2012 | Halder et al. |
| 2012/0308456 A1 | 12/2012 | Leta et al. |
| 2012/0312163 A1 | 12/2012 | Leta et al. |
| 2013/0061755 A1 | 3/2013 | Frederick et al. |
| 2013/0095996 A1 | 4/2013 | Buelow et al. |
| 2013/0225898 A1 | 8/2013 | Sundaram et al. |
| 2013/0327216 A1 | 12/2013 | Deckman et al. |
| 2014/0013955 A1 | 1/2014 | Tammera et al. |
| 2014/0060326 A1 | 3/2014 | Sundaram et al. |
| 2014/0157984 A1 | 6/2014 | Deckman et al. |
| 2014/0157986 A1 | 6/2014 | Ravikovitch et al. |
| 2014/0174291 A1 | 6/2014 | Gupta et al. |
| 2014/0208797 A1 | 7/2014 | Kelley et al. |
| 2014/0216254 A1 | 8/2014 | Tammera et al. |
| 2015/0013377 A1 | 1/2015 | Oelfke |
| 2015/0068397 A1 | 3/2015 | Boulet et al. |
| 2015/0010483 A1 | 4/2015 | Perry et al. |
| 2015/0101483 A1 | 4/2015 | Perry et al. |
| 2015/0196870 A1 | 7/2015 | Albright et al. |
| 2015/0328578 A1 | 11/2015 | Deckman et al. |
| 2015/0361102 A1 | 12/2015 | Inubshi et al. |
| 2016/0016865 A1 | 1/2016 | Dolan |
| 2016/0023155 A1 | 1/2016 | Ramkumar et al. |
| 2016/0129433 A1 | 5/2016 | Tammera et al. |
| 2016/0166972 A1 | 6/2016 | Owens et al. |
| 2016/0236135 A1 | 8/2016 | Tammera et al. |
| 2016/0332105 A1 | 11/2016 | Tammera et al. |
| 2016/0332106 A1 | 11/2016 | Tammera et al. |
| 2017/0056814 A1 | 3/2017 | Marshall et al. |
| 2017/0113173 A1 | 4/2017 | Fowler et al. |
| 2017/0113175 A1 | 4/2017 | Fowler et al. |
| 2017/0136405 A1 | 5/2017 | Ravikovitch et al. |
| 2017/0266604 A1 | 9/2017 | Tammera et al. |
| 2017/0282114 A1 | 10/2017 | Owens et al. |
| 2017/0341011 A1 | 11/2017 | Nagavarapu et al. |
| 2017/0341012 A1 | 11/2017 | Nagavarapu et al. |
| 2018/0001301 A1 | 1/2018 | Brody et al. |
| 2018/0056229 A1 | 3/2018 | Denton et al. |
| 2018/0056235 A1 | 3/2018 | Wang et al. |
| 2018/0169565 A1 | 6/2018 | Brody et al. |
| 2018/0169617 A1 | 6/2018 | Brody et al. |
| 2018/0339263 A1 | 11/2018 | Dehaas et al. |
| 2019/0091651 A1 | 3/2019 | Bhadra et al. |
| 2019/0091652 A1 | 3/2019 | Lozinska et al. |
| 2019/0224613 A1 | 7/2019 | Nagavarapu et al. |
| 2019/0262764 A1 | 8/2019 | Johnson |
| 2019/0262765 A1 | 8/2019 | Barnes et al. |
| 2020/0197856 A1 | 6/2020 | Fulton et al. |

FOREIGN PATENT DOCUMENTS

| | | |
|---|---|---|
| EP | 0257493 | 2/1988 |
| EP | 0426937 | 5/1991 |
| EP | 0904827 | 3/1999 |
| EP | 0953374 | 3/1999 |
| EP | 1110593 | 6/2001 |
| EP | 1674555 | 6/2006 |
| EP | 2754488 | 7/2014 |
| EP | 2823872 | 1/2015 |
| FR | 2854819 | 5/2003 |
| FR | 2924951 | 6/2009 |
| JP | 58-114715 | 7/1983 |
| JP | 59-232174 | 12/1984 |
| JP | 60-189318 | 12/1985 |
| JP | 2002-253818 | 10/1990 |
| JP | 04-180978 | 6/1992 |
| JP | 06006736 | 6/1992 |
| JP | H05-037318 U | 5/1993 |
| JP | H6-6736 U | 1/1994 |
| JP | 3477280 | 8/1995 |
| JP | 2011-169640 | 6/1999 |
| JP | 2011-280921 | 10/1999 |
| JP | 2000-024445 | 8/2001 |
| JP | 2002-348651 | 12/2002 |
| JP | 2003180838 | 2/2003 |
| JP | 2006-016470 | 1/2006 |
| JP | 2006-036849 | 2/2006 |
| JP | 2008-272534 | 11/2008 |
| JP | 2011-083726 | 4/2011 |
| JP | 2013-244469 A | 12/2013 |
| JP | 2016-121414 | 7/2016 |
| KR | 10-0220576 | 9/1999 |
| KR | 101349424 | 1/2014 |
| RU | 2329094 | 12/2006 |
| RU | 2547115 C2 | 4/2015 |
| WO | WO2002/024309 | 3/2002 |
| WO | WO2002/073728 | 9/2002 |
| WO | WO 03/04438 A2 | 1/2003 |
| WO | WO2005/090793 | 9/2005 |
| WO | WO2010/024643 | 3/2010 |
| WO | WO2011/139894 | 11/2011 |

OTHER PUBLICATIONS

Allen, M. P. et al., (1987) "Computer Simulation of Liquids" Clarendon Press, pp. 156-160.

Asgari, M. et al., (2014) "Designing a Commercial Scale Pressure Swing Adsorber for Hydrogen Purification" *Petroleum & Coal*, vol. 56(5), pp. 552-561.

Baerlocher, C. et al., (2017) International Zeolite Association's "Database of Zeolite Structures," available at https://www.iza-structure.org/databases/, downloaded Jun. 15, 2018, 1 page.

Bernad, S. I. (2012) "Numberical Model for Cavitational Flow in Hydraulic Poppet Valves" *Modelling and Simulation in Engineering*, vol. 2012, Article ID 742162, 10 pages.

Burtch, N.C. et al., (2015) "Molecular-level Insight into Unusual Low Pressure CO2 Affinity in Pillared Metal-Organic Frameworks," *J Am Chem Soc*, 135, pp. 7172-7180.

Beauvais, C. et al., (2004) "Distribution of Sodium Cations in Faujasite-Type Zeolite: A Canonical Parallel Tempering Simulation Study," *J Phys Chem B*, 108, pp. 399-404.

Cheung, O. et al., (2013) "Adsorption kinetics for CO2 on highly selective zeolites NaKA and nano-NaKA," *Appl Energ*, 112, pp. 1326-1336.

Cygan, R. T. et al., (2004) "Molecular Models of Hydroxide, Oxyhydroxide, and Clay Phases and the Development of a General Force Field", *J Phys Chem B*, vol. 108, pp. 1255-1266.

Deem, M. W. et al., (2009) "Computational Discovery of New Zeolite-Like Materials", *J Phys Chem C*, 113, pp. 21353-21360.

Demiralp, E., et al., (1999) "Morse Stretch Potential Charge Equilibrium Force Field for Ceramics: Application to the Quartz-Stishovite Phase Transition and to Silica Glass", *Physical Review Letters*, vol. 82(8), pp. 1708-1711.

Dubbeldam, D., et al., (2013) "On the inner workings of Monte Carlo codes" *Molecular Simulation*, vol. 39, Nos. 14-15, pp. 1253-1292.

Dubbeldam, D. et al. (2016) "RASPA: molecular simulation software for adsorption and diffusion in flexible nanoporous materials" *Molecular Simulation*, (published online Feb. 26, 2015), vol. 42(2), pp. 81-101.

Earl, D. J. et al., (2005) "Parallel tempering: Theory, applications, and new perspectives," *Phys Chem Chem Phys*, vol. 7, pp. 3910-3916.

ExxonMobil Research and Engineering and QuestAir (2008) "A New Commercialized Process for Lower Cost H2 Recovery—Rapid Cycle Pressure Swing Adsorption (RCPSA)," *Brochure*, 4 pgs.

Fang, H., et al., (2012) "Prediction of CO2 Adsorption Properties in Zeolites Using Force Fields Derived from Periodic Dispersion-Corrected DFT Calculations," J Phys Chem C, 116, ACS Publications, pp. 10692-10701.

Fang, H. et al., (2013) "First principles derived, transferable force fields for CO2 adsorption in Na-exchanged cationic zeolites," Phys Chem Chem Phys, vol. 15, pp. 12882-12894.

(56) References Cited

OTHER PUBLICATIONS

Fang, H. et al. (2014) "Recent Developments in First-Principles Force Fields for Molecules in Nanoporous Materials", Journal of Materials Chemistry A, 2014, vol. 2, pp. 274-291.

Fang, H. et al. (2016) "Identification of High-$CO_2$-Capacity Cationic Zeolites by Accurate Computational Screening", American Chemical Society, Chemistry of Materials, 2016, vol. 28, pp. 3887-3896.

Farooq, S. et al. (1990) "Continuous Countercurrent Flow Model for a Bulk PSA Separation Process," *AIChE J.*, v36 (2) p. 310-314.

FlowServe (2005) "Exceeding Expectations, US Navy Cuts Maintenance Costs With Flowserve GX-200 Non-Contacting Seal Retrofits," *Face-to-Face*, v17.1, 8 pgs.

Foster, M.D., et al. "A geometric solution to the largest-free-sphere problem in zeolite frameworks", *Microporous and Mesoporous Materials*, vol. 90, pp. 32-38.

Frenkel, D. et al., (2002) "Understanding Molecular Simulation: From Algorithms to Applications", 2nd ed., *Academic Press*, pp. 292-301.

Garcia, E. J., et al. (2014) "Tuning the Adsorption Properties of Zeolites as Adsorbents for CO2 Separation: Best Compromise between the Working Capacity and Selectivity", *Ind. Eng. Chem. Res.*, vol. 53, pp. 9860-9874.

Garcia-Sanchez, A., et al. (2009) "Transferable Force Field for Carbon Dioxide Adsorption in Zeolites", J. Phys. Chem. C 2009, vol. 113, pp. 8814-8820.

GE Oil & Gas (2007) "Dry Gas Seal Retrofit," Florence, Italy, www.ge.com/oilandgas, 3 pgs.

Harris, J. G. et al., (1995) "Carbon Dioxide's Liquid—Vapor Coexistence Curve and Critical Properties as Predicted by a Simple Molecular Model", *J Phys Chem*, vol. 99, pp. 12021-12024.

Hill, J. R. et al., (1995) "Molecular Mechanics Potential for Silica and Zeolite Catalysts Based on ab Initio Calculations. 2. Aluminosilicates", *J Phys Chem*, vol. 99, pp. 9536-9550.

Hopper, B. et al. (2008) "World's First 10,000 psi Sour Gas Injection Compressor," *Proceedings of the 37th Turbomachinery Symposium*, pp. 73-95.

Jain, S., et al. (2003) "Heuristic design of pressure swing adsorption: a preliminary study", *Separation and Purification Technology*, vol. 33, pp. 25-43.

Jaramillo, E. et al. (2004) "Adsorption of Small Molecules in LTA Zeolites, 1. $NH_3$, $CO_2$, and $H_2O$ in Zeolite 4A", J. Phys. Chem. B 2004, vol. 108, pp. 20155-20159.

Kim J. et al. (2012) "Predicting Large CO2 Adsorption in Aluminosilicate Zeolites for Postcombustion Carbon Dioxide Capture", *J. Am. Chem. Soc.*, vol. 134, pp. 18940-18940.

Kärger, J., et al. (2012) "Diffusion in Nanoporous Materials", Whiley-VCH publisher, vol. 1, Chapter 16, pp. 483-501.

Kikkinides, E. S. et al. (1995) "Natural Gas Desulfurization by Adsorption: Feasibility and Multiplicity of Cyclic Steady States," *Ind. Eng. Chem. Res.* V. 34, pp. 255-262.

Lin, L., et al. (2012) "In silico screening of carbon-capture materials", *Nature Materials*, vol. 1, pp. 633-641.

Liu, Q. et al., (2010) "NaKA sorbents with high $CO_2$-over-$N_2$ selectivity and high capacity to adsorb $CO_2$," *Chem Commun.*, vol. 46, pp. 4502-4504.

Loewenstein, W., (1954) "The Distribution of Aluminum in the Tetra-Hedra of Silicates and Aluminates" Am Mineral, 92-96.

Maurin et al. (2005) "Adsorption Mechanism of Carbon Dioxide in Faujasites: Grand Canonical Monte Carlo Simulations and Microcalorimetry Measurements", J. Phys. Chem. B 2005, vol. 109, pp. 16084-16091.

Neimark, A. V. et al., (1997) "Calibration of Pore Volume in Adsorption Experiments and Theoretical Models", *Langmuir*, vol. 13, pp. 5148-5160.

Palomino, M., et al. (2009) "New Insights on CO2-Methane Separation Using LTA Zeolites with Different Si/Al Ratios and a First Comparison with MOFs", Langmar, vol. 26(3), pp. 1910-1917.

Patcas, F.C. et al. (2007) "CO Oxidation Over Structured Carriers: A Comparison of Ceramic Forms, Honeycombs and Beads", *Chem Engineering Science*, v. 62, pp. 3984-3990.

Peng, D. Y., et al., (1976) "A New Two-Constant Equation of State", *Ind Eng Chem Fundam*, vol. 15, pp. 59-64.

Pham, T. D. et al., (2013) "Carbon Dioxide and Nitrogen Adsorption on Cation-Exchanged SSZ-13 Zeolites", Langmuir, vol. 29, pp. 832-839.

Pophale, R., et al., (2011) "A database of new zeolite-like materials", *Phys Chem Chem Phys*, vol. 13(27), pp. 1412.

Potoff, J. J. et al., (2001) "Vapor-Liquid Equilibria of Mixtures Containing Alkanes, Carbon Dioxide, and Nitrogen", AIChE J, vol. 47(7), pp. 1676-1682.

Rameshni, Mahin "Strategies for Sour Gas Field Developments," *Worley Parsons-Brochure*, 20 pp.

Reyes, S. C. et al. (1997) "Frequency Modulation 2407—12Methods for Diffusion and Adsorption Measurements in Porous Solids," *J. Phys. Chem. B.* v101, pp. 614-622.

Rezaei, F. et al. (2009) "Optimum Structured Adsorbents for Gas Separation Process", *Chem. Engineering Science*, v. 64, pp. 5182-5191.

Richardson, J.T. et al. (2000) "Properties of Ceramic Foam Catalyst Supports: Pressure Dop", *Applied Catalysis A: General* v. 204, pp. 19-32.

Robinson, D. B., et al., (1985) "The development of the Peng-Robinson Equation and its Application to Phase Equilibrium in a System Containing Methanol," *Fluid Phase Equilibria*, vol. 24, pp. 25-41.

Ruthven, D. M. et al. (1996) "Performance of a Parallel Passage Adsorbent Contactor," *Gas. Sep. Purif.*, vol. 10, No. 1, pp. 63-73.

Stahley, J. S. (2003) "Design, Operation, and Maintenance Considerations for Improved Dry Gas Seal Reliability in Centrifugal Compressors," *Dresser-Rand, Tech. Paper* 134, 15 pages.

Santos, M. S (2011) "New Cycle configuration to enhance performance of kinetic PSA processes" Chemical Engineering Science 66, pp. 1590-1599.

Snurr, R. Q. et al., (1993) "Prediction of Adsorption of Aromatic Hydrocarbons in Silicalite from Grand Canonical Monte Carlo Simulations with Biased Insertions", *J Phys Chem*, vol. 97, pp. 13742-13752.

Corbin, D. R., et al (1990) "Flexibility of the zeolite RHO framework: in situ x-ray and neutron powder structural characterization of divalent cation-exchanged zeolite RHO" *J. Am. Chem. Soc.* 112, 12, pp. 4821-4830.

Corbin, D. R. (1991) "Flexibility of the zeolite RHO framework: Effect of dehydration on the crystal structure of the beryllophosphate mineral, pahasapaite" *Zeolites* 11, pp. 364-367.

Corbin, D. R., et al. (1993) "Entrapment and controlled release of xenon in Cd2+-exchanged zeolite rho" *J. Chem. Soc., Chem. Commun.*, pp. 1027-1029.

Carmo, M. J., et al. (2002) "ethanol-Water Separation in the PSA Process", *Adsorption* 8, pp. 235-248.

Lozinska, M. M., et al. (2014) "Cation Gating and Relocation during the Highly Selective "Trapdoor" Adsorption of CO2 on Univalent Cation Forms of Zeolite Rho" *Chem. Mater.* 26, 6, pp. 2052-2061.

Nenoff, T. M., et al. (1996) "Flexibility of the Zeolite RHO Framework. In Situ X-ray and Neutron Powder Structural Characterization of Cation-Exchanged BePO and BeAsO RHO Analogs" *Journal of Physical Chemistry* 100, 33, pp. 14256-14264.

Simo, M., (2009) "Adsorption/Desorption of Water and Ethanol and 3A Zeolite in Near-Adiabatic Fixed Bed", *Ind. Eng. Chem. Res.* pp. 9247-9260.

Robson, H. E., et al. (1973) "Synthesis and Crystal Structure of Zeolite Rho—A New Zeolite Related to Linde Type A" *Adv. Chem. Ser.*, 121, pp. 106-115.

Palomino, M., et al. (2011) "Zeolite Rho: a highly selective adsorbent for CO2/CH4 separation induced by a structural phase modification" *Chem. Commun.*, 48, 215-217.

Stemmet, C.P. et al. (2006) "Solid Foam Packings for Multiphase Reactors: Modelling of Liquid Holdup and Mass Transfer", *Chem. Engineering Research and Design*, v. 84(A12), pp. 1134-1141.

Suzuki, M. (1985) "Continuous-Countercurrent-Flow Approximation for Dynamic Steady State Profile of Pressure Swing Adsorption" *AIChE Symp. Ser.* v81 (242) pp. 67-73.

(56) References Cited

OTHER PUBLICATIONS

Talu, O. et al., (2001), "Reference potentials for adsorption of helium, argon, methane, and krypton in high-silica zeolites," *Colloids and Surfaces A: Physicochemical and Engineering Aspects,* vol. 83-93, pp. 83-93.

Walton, K. S. et al., (2006) "CO2 adsorption in Y and X zeolites modified by alkali metal cation exchange," *Microporous and Mesoporous Mat,* vol. 91, pp. 78-84.

Willems, T. F. et al., (2012) "Algorithms and tools for high-throughput geometry-based analysis of crystalline porous materials" *Microporous Mesoporous Mat,* vol. 149, pp. 134-141.

Zukal, A., et al., (2009) "Isosteric heats of adsorption of carbon dioxide on zeolite MCM-22 modified by alkali metal cations", *Adsorption,* vol. 15, pp. 264-270.

Foster, M.D., et al., "A geometric solution to the largest-free-sphere problem in zeolite frameworks", Microporous and Mesoporous Materials 90, (2006), pp. 32-38, vol. 90.

Remeshni, Mahin, "Strategies for Sour Gas Field Developments", Worley Parsons-Brochure, (May 19, 2007), 20 pgs.

\* cited by examiner

— 3 um

— 667nm

DEHYDRATION PROCESSES UTILIZING CATIONIC ZEOLITE RHO

CROSS-REFERENCE TO RELATED APPLICATION

This application claims the benefit of U.S. Provisional Patent Application 62/915,993 filed 16 Oct. 2019 entitled DEHYDRATION PROCESSES UTILIZING CATIONIC ZEOLITE RHO, the entirety of which is incorporated by reference herein.

BACKGROUND OF THE INVENTION

Gas separation is important in various industries and can typically be accomplished by flowing a mixture of gases over an adsorbent that preferentially adsorbs a more readily adsorbed component relative to a less readily adsorbed component of the mixture. One of the more important gas separation techniques is pressure swing adsorption (PSA). PSA processes rely on the fact that under pressure gases tend to be adsorbed within the pore structure of microporous adsorbent materials or within the free volume of polymeric materials. The higher the pressure, the more gas is adsorbed. When the pressure is reduced, the adsorbed gas is released, or desorbed. PSA processes can be used to separate gases from a mixture of gases because different gases tend to adsorb in the micropores or free volume of the adsorbent to different extents. For example, if a gas mixture such as natural gas is passed under pressure through a vessel containing polymeric or microporous adsorbent that fills with more nitrogen than it does methane, part or all of the nitrogen will stay in the sorbent bed, and the gas coming out of the vessel will be enriched in methane. When the bed reaches the end of its capacity to adsorb nitrogen, it can be regenerated by reducing the pressure, thereby releasing the adsorbed nitrogen. It is then ready for another cycle. When the desorption step is performed at sub-ambient pressures the process is referred to as vacuum pressure swing adsorption (VPSA).

Another important gas separation technique is temperature swing adsorption (TSA). TSA processes also rely on the fact that under pressure gases tend to be adsorbed within the pore structure of the microporous adsorbent materials or within the free volume of a polymeric material. When the temperature of the adsorbent is increased, the gas is released, or desorbed. By cyclically swinging the temperature of adsorbent beds, TSA processes can be used to separate gases in a mixture when used with an adsorbent that selectively adsorbs one or more of the components in the gas mixture relative to another. Combined PSA/TSA processes may also be utilized in the art for adsorption processes. In such combined PSA/TSA processes the pressure is decreased while the temperature is also increased during a desorption step in order to facilitate desorption of the components adsorbed in the adsorbent material. A purge gas may also be utilized during the desorption step or in an adjoining purge step to further facilitate removal of the adsorbed components by lowering the partial pressure of the adsorbed components, raising the temperature of the adsorbent material (e.g., by utilizing a heated purge gas), or a combinations thereof.

Yet another gas separation technique is referred to as partial pressure purge swing adsorption (PPSA). In this process the adsorbent is cyclically regenerated by passing a gas past the adsorbent material that can remove the adsorbed component. In one embodiment the regenerating gas can be competitively adsorbed in which case it can displace the previously adsorbed species. In another embodiment the regenerating gas is not adsorbed or weakly adsorbed in which case the gas removes the adsorbed component by reducing its fugacity (i.e. partial pressure).

All of these methods are examples of swing adsorption processes and throughout this application PSA, VPSA, TSA, PPSA, combinations of them as well as other swing adsorption processes (noted further herein) will be referred to as swing adsorption processes.

Adsorbents for swing adsorption processes are typically very porous materials chosen because of their large surface area. Typical adsorbents are activated carbons, silica gels, aluminas, and zeolites. In some cases a polymeric material can be used as the adsorbent material. Though the gas adsorbed on the interior surfaces of microporous materials may consist of a layer of only one, or at most a few molecules thick, surface areas of several hundred square meters per gram enable the adsorption of a significant portion of the adsorbent's weight in gas.

Different molecules can have different affinities for adsorption into the pore structure or open volume of the adsorbent. This provides one mechanism for the adsorbent to discriminate between different gases. In addition to their affinity for different gases, zeolites and some types of activated carbons, called carbon molecular sieves, may utilize their molecular sieve characteristics to exclude or slow the diffusion of some gas molecules into their structure. This provides a mechanism for selective adsorption based on the size of the molecules and usually restricts the ability of the larger molecules to be adsorbed. Either of these mechanisms can be employed to selectively fill the micropore structure of an adsorbent with one or more species from a multi-component gas mixture.

Zeolite RHO was reported in 1973 in U.S. Pat. No. 3,720,753 to Robson et al., and is described in the database maintained by the Structure Commission of the International Zeolite Association (IZA). The zeolite was prepared from aluminosilicate gels containing a mixture of sodium and cesium cations. The product possessed Si/Al atomic ratio of 3 and a Na/Cs ratio of about 3. The as-made form has a cubic, body-centered cubic unit cell with a=15.02 Å. Upon drying at 120° C., the unit cell was reported to shrink to 14.6 Å. The calcined $H^+$ form of the zeolite has a cubic unit cell dimension of about 15.0 Å. The topological framework (RHO) is composed of Linde type A (LTA) cages that are linked to adjacent LTA cages through the 8-rings to create double 8-rings (D8R). In contrast, the LTA framework is composed of sodalite cages that link to other sodalite cages through 4-rings to create double 4-rings and a larger LTA cage.

Although the framework density of LTA (12.9 T atom/$nm^3$) is lower than that of RHO (14.1 T atom/nm3), the hypothetical accessible micropore volume of an all-silica RHO is greater than that of all-silica LTA because the space within the LTA sodalite cages is not accessible to nitrogen under typical conditions of nitrogen physisorption used to determine microporosity. In contrast, the space within the LTA and D8R cages of RHO is available to small adsorbate molecules such as nitrogen. McCusker and Baerlocher (Proceedings of the 6th International Zeolite Conference, 812-821, 1984, Butterworth and Co) performed Rietveld refinements of powder X-ray diffraction data that show the dramatic effects of dehydration/hydration on the structure. Upon heating to 100° C., the symmetry changes from Im3m to I4bar3m and the 8-rings become elliptical in shape. The 8-ring window size shrinks from 3.6 to 2.3 Å. The degree of distortion in the 8-rings depends strongly on the nature of the exchanged cations (Corbin et al. J. Am. Chem. Soc., 1990, 112 (12), pp 4821-4830).

Palomino et al. (Chem. Commun., 2012, 48, 215-217) reported that zeolite RHO successfully separates $CO_2$ from $CH_4$ with the highest selectivity among known zeolites. They attribute the high selectivity and high $CO_2$ adsorption capacity of zeolite RHO to a combination of the pore aperture and the expansion of the void volume upon phase transition. At low pressure the elliptical pores do not allow passage of methane but it does allow adsorption of $CO_2$. As the zeolite adsorbs more $CO_2$ at higher pressures, the zeolite undergoes a phase transition from I4bar3m to Im3m and the windows become circular and larger. At this point, methane can begin to adsorb, but most of the void volume is occupied by carbon dioxide. The phase change is akin to what occurs when water is adsorbed into the dehydrated structure.

An important need in the industry involves the dehydration (water removal) of process feed streams. These feed streams can be comprised of water and carbon dioxide ($CO_2$) which can combine to form "what is known in the industry as "wet $CO_2$" or "acid gas". The process feed streams may also comprise other components, such as hydrocarbons (particularly light hydrocarbon gas feed streams such as methane, ethane, propane and/or butane), nitrogen ($N_2$), hydrogen sulfide ($H_2S$), and other components/contaminants. Particularly problematic feed streams can contain water and $CO_2$ (and optionally $H_2S$) as these components can be considered to be "acid gases" which have a low pH and can be detrimental to swing adsorbent units by physically deteriorating mechanical components, adsorbent materials, and/or deteriorating the transport properties of the adsorbent material (for example slowing down of the transport kinetics by forming surface barriers or reducing bulk diffusion coefficients or by lowering the adsorption capacity). Dehydration of feed streams to certain threshold levels is important in the industry as removal of water from such feed streams may be required to meet specifications and process requirements for such things as pipeline specifications, cryogenic applications, dehydration for air separation processes including nitrogen purification/production as well as $O_2$/Ar separation, and miscellaneous intermediate process steps, particularly in the oil and gas industry. When cryogenic processes are used to meet product specifications the dehydration may have to be conducted to levels of 10 ppm, or 1 ppm or 0.01 ppm by volume (or mole fraction).

It has been found as shown herein that while swing adsorption processes may be particularly applicable for dehydration of such feed streams, that the preferred LTA zeolites of the prior art for use in swing adsorption processes have poor thermal and/or hydrothermal stability in wet $CO_2$ feed stream environments. Accordingly, there remains a need in the industry for processes and adsorption materials that provide enhancements in stability and reliability for use in swing adsorption processes thus allowing the swing adsorption processes to operate for extended time before change out of degraded active adsorbent materials. The present materials and processes provide swing adsorption processes with improved stability and better regeneration at lower temperature particularly for rapid cycle swing adsorption process dehydration configurations. Accordingly, the present materials and processes overcome the drawbacks of conventional prior art and provides and provides a novel solution to this industry problem.

SUMMARY OF THE INVENTION

This invention includes a highly stabilized, cationic form of zeolite RHO and its use in swing adsorption processes for dehydration of process feed streams, particularly feed streams comprising acid gases.

An example embodiment of the present invention is a process for removing water from a feed stream, the process comprising performing a swing adsorption process by:

a) performing an adsorption step, wherein the adsorption step comprises passing a feed stream comprising water through an adsorbent bed unit comprising at least one adsorbent bed wherein water is selectively separated from the feed stream to form a product stream which has a lower molar fraction of water than the feed stream, wherein the adsorbent bed comprises an adsorbent material which is a cationic zeolite RHO comprising at least one metal cation;

b) interrupting the flow of the feed stream;

c) performing a desorption step, wherein the desorption step comprises removing at least a portion of the water from the adsorbent material; and d) repeating the steps a) to c) for at least one additional cycle.

Another example embodiment of the present invention is a swing adsorption system for removing water from a feed stream, the system comprising:

a) at least one adsorbent contactor containing an adsorbent bed;

b) a feed stream inlet fluidly connected to the at least one adsorbent contactor; and c) a product stream outlet fluidly connected to the at least one adsorbent contactor;

wherein the adsorbent bed comprises an adsorbent material which is a cationic zeolite RHO comprising at least one metal cation.

Another example embodiment of the present invention is wherein the cationic zeolite RHO is a RHO framework zeolite comprising at least one metal cation selected from the Group 1 and Group 2 elements (new Group 1-18 IUPAC numbering), and the ratio of average atomic metal cation charge to the atomic Al plus Ga content in the crystal as measured by either XRF or AA/ICP is from 0.7 (atomic charges per atom) to 1.5 (atomic charges per atom).

DETAILED DESCRIPTION

Figure 1A:
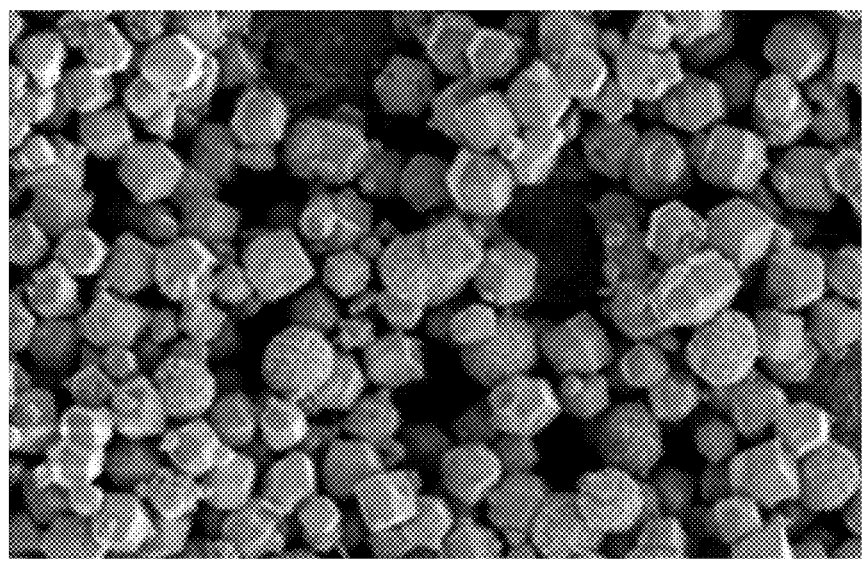
FIGS. 1A and 1B are field emission scanning electron microscopy (SEM) images of synthesized NaCs—RHO zeolite crystals shown at two (2) different magnification levels as noted.

This invention includes a cationic zeolite RHO and its use in swing adsorption processes for dehydration of process feedstreams, particularly feedstreams comprising water and $CO_2$. In particular, is disclosed a cationic form of zeolite RHO utilized in pressure swing adsorption processes (PSA), temperature swing adsorption processes (TSA), partial pressure swing adsorption processes (PPSA), rapid temperature swing adsorption (RTSA), rapid cycle pressure swing absorption (RCPSA), rapid cycle partial pressure swing adsorption (RCPPSA), or a combination thereof, which may be collectively referred to herein as "swing adsorption processes" unless further defined. The term "rapid cycle swing adsorption processes" refer to rapid temperature swing adsorption (RTSA), rapid cycle pressure absorption (RCPSA), rapid cycle partial pressure swing adsorption (RCPPSA), or a combination thereof. The term "rapid cycle swing adsorption processes" will include such processes as mentioned wherein the total cycle time or period for the rapid cycle swing adsorption processes to go through a full cycle, such as feed/product step(s), desorption step(s), purge step(s) and repressurization step(s) and back to the next feed/product step(s), is a period greater than 1 second and less than 600 seconds. In preferred embodiments, total cycle time or period for the rapid cycle swing adsorption processes is greater than 2 seconds and less than 300 seconds.

These swing adsorption processes may be used to separate gases of a gas mixture because different gases tend to fill the micropore of the adsorbent material to different extents Conventional PSA, TSA, or such techniques are generally operated with cycle times (particularly adsorption steps or cycles) of sufficient duration to allow the adsorption of the components to come to near equilibrium conditions (i.e., allowing the adsorbent to selectively adsorb the amount of one component relative to another simply by the inherent equilibrium selectivity of the adsorbent at adsorption conditions). In most rapid cycle adsorption processes the kinetics of the adsorbent are fast enough so that some components of the feed equilibrate with the adsorbent material. However, in many "rapid cycle" swing adsorption processes, the adsorption cycle is operated at a short enough duration so that some components of the feed do not equilibrate with the adsorbent material (i.e. are predominantly excluded from the adsorbent). As such, all components in a multicomponent feed stream do not reach equilibrium loadings in the adsorbent and the competitive separation does not come to equilibrium conditions, but instead operates in a "kinetic" separation regime. In this mode, cycle times and process conditions (particularly in the adsorption step) are designed to take advantage of the relative kinetic adsorption rates (or "diffusivity" rates) between various components (i.e., some components may adsorb "faster" than other components) to facilitate and improve the separation efficiency of the rapid cycle processes. In some other rapid cycle processes the kinetics of the transport do not provide discrimination between different species and selectivity is achieved from the competitive equilibrium adsorption isotherm which is related to the relative adsorption strength of different molecules. For an example related to the dehydration processes herein it is preferred that the kinetic adsorption rate of water be fast enough to reach equilibrium water loadings in the adsorbent within the time allotted for the adsorption step. It is even more preferred that the kinetics of the water adsorption process be fast enough to reach equilibrium water loadings in the adsorbent within one-fifth of the time allotted for the adsorption step. It is also preferred that the equilibrium selectivity for water in the adsorbent be greater than for any of the other components in the feed stream. In a more preferred embodiment the kinetic selectivity for water uptake is faster than for other components in the feed stream. In a most preferred embodiment, the kinetic uptake rate of the other components in the feed stream does not allow them to reach equilibrium loadings in the time of the adsorption step. If a gas mixture, such as natural gas containing water (or water vapor), is passed under pressure through a vessel containing an adsorbent material that is more selective towards water vapor than it is for methane, at least a portion of the water vapor is selectively adsorbed by the adsorbent material, and the gas exiting the vessel is enriched in methane. As such, the adsorbent would be considered to have a "selectivity" (or "greater selectivity") for water over methane which can come from either equilibrium loading (competitive adsorption), kinetics (relative adsorption rates) or combinations of these effects. Before the adsorbent material reaches the end of its capacity to adsorb water vapor it is switched from an adsorption step (or "cycle") to a desorption step. Desorption can be accomplished by raising the temperature of the adsorbent (TSA), purging the adsorbent with a dry stream (PPSA), reducing the pressure of the adsorbent (PSA) or by combinations of these methods. Once the adsorbent has gone through a desorption step it is ready for another adsorption step. Other additional steps such as depressurization, purging, repressurization, reheating, or cooling may alternatively be included in the overall process steps. The combination of the overall steps from the beginning of one adsorption step to the next adsorption step may be referred to as the "total cycle" or the "swing adsorption process cycle". Such cycles would also apply in the case of both conventional swing adsorption processes and rapid cycle swing adsorption processes.

While not limiting, the swing adsorption processes herein preferably further include the use of an adsorbent comprising a cationic zeolite RHO, wherein the feed stream is comprised of water, and optionally, other components such as hydrocarbons, $CO_2$, nitrogen ($N_2$), and/or hydrogen sulfide ($H_2S$); and further wherein at least a portion of the water is preferentially removed from the feed stream of the swing adsorption processes wherein the swing adsorption processes produces a product stream wherein the term preferentially removal of water (or the like) means that the wt % of water in the product stream (based on the total product stream) is less than the wt % of water in the feed stream (based on the total feed stream). This is equivalent to the statement that the mole % of water in the product stream (based on the total product stream) is less than the mole % of water in the feed stream (based on the total feed stream). Embodiments of the invention are particularly applicable to swing adsorption processes that rigorously dehydrate the feed stream. Rigorous dehydration is achieved when the product stream from the swing adsorption process contains less than 10 ppm (mole fraction) of water, preferable less than 1 ppm (mole fraction) of water, and even more preferably less than 0.1 ppm (mole fraction) of water. Embodiments of the invention may also be utilized for the removal of water from such feed streams may be required to meet specifications and process requirements for such things as pipeline specifications, cryogenic applications, dehydration for air separation processes including nitrogen purification/production as well as $O_2$/Ar separation, and miscellaneous intermediate process steps, particularly in the oil and gas industry.

Zeolite LTA has been a favored zeolite for use in dehydration and rigorous dehydration processes due to its high $H_2O$ uptake capacity. However, it has been discovered herein that while zeolite LTA has a high capacity for water as performed in slow cycle testing, that LTA, when repeatedly thermally cycled under wet $CO_2$ conditions (i.e., a stream comprising water and $CO_2$), that the water adsorption capacity can quickly and significantly deteriorate. While water adsorption capacity is an important consideration in the selection of an adsorbent material in a swing adsorption process, significant deterioration of the adsorbent capacity cannot be tolerated as, to be used in an economically justifiable commercial application, particularly in rapid swing adsorption processes, the adsorbent materials must be able to be operated in processes comprising thousands to hundreds of thousands of cycles between adsorbent change-outs.

The invention discloses the use of a cationic zeolite RHO as dehydration adsorbent that possesses significant stability for feed gas (or "feed streams") which comprise acidic gas such as $CO_2$. It has been discovered, that when subjected to numerous swing adsorption cycles, that common LTA molecular sieve adsorbents such as 3A, 4A and 5A (or "zeolite A") show continuous degradation particularly during the temperature swing cycles for removing $H_2O$ especially with combinations of $CO_2$ present in the feed stream. The cationic zeolite RHO shows much better stability and much less degradation for dehydration applications with feed containing wet $CO_2$ (also known as an "acid gas" or "wet acidic gas"). This is surprising because the structure of zeolite RHO is related to Linde type A zeolites such as 3A, 4A and 5A [Robson, H. E., Shoemaker, D. P., Ogilvie, R. A. and Manor, P. C., *Adv. Chem. Ser.*, 121, 106-115 (1973)].

All of the descriptions of zeolite RHO refer to the IZA structure code of RHO which will include the other structure types such as the berrylophosphate, zinc berrylophosphates, LZ-214 or other UOP equivalents, cobalt phosphates, manganese aluminophosphates, magnesium aluminophosphates, and minerals such as pahasapaite. In addition to the aluminosilicate version of the zeolite, the gallosilicate version, ECR-10, may be utilized in preferred embodiments of the cationic zeolite RHO herein. Forms of these with cations to balance charge in the framework are preferred. In particular the aluminosilicate and gallosilicate versions of the cationic zeolite RHO are preferred and most preferred are the aluminosilicate versions of the cationic zeolite RHO.

In many syntheses of the aluminosilicate versions of zeolite RHO that use inorganic cations, the crystallization can result in other impurities which form as a function of the gel composition or the kinetics of the reaction. Zeolite RHO with impurity phases from syntheses with inorganic cations or other synthesis routes (including those that make the gallosilicate version) can still be useful. Impurity phases may be present from 0 to 50% (mass), preferably, 0 to 25% (mass), more preferably, 0 to 10% (mass), and even more preferably, 0 to 2% (mass) as measured by XRD, SEM, rotation electron diffraction, or electron diffraction. Examples of impurity phases for the aluminosilicate versions of zeolite RHO include faujasite, chabazite, pollucite, zeolite P, gismodine, amorphous components, and dense phases, i.e. structures with the largest window containing 6 T-atoms or lower, such as Cs or Na non-porous aluminosilicates, quartz, analcite, sodalite, and tridymite.

The zeolite RHO to be used in the current application requires that the charge in the framework, generated from insertion of tetrahedral aluminum or gallium species into a tetrahedrally coordinated silica network, be balanced by monovalent, divalent, or trivalent cations. Preferably these cations are an alkali cation, alkaline earth cation, rare earth cation, or mixtures thereof which will be referred to as metal cations. Nonmetal cations are taken to be H+ and $NH4^+$. For RHO zeolites useable in the current application, the ratio of average atomic "metal" cation charge to the atomic Al plus Ga content (where Al is required, but Ga is optional, i.e., Al content is greater than 0 and Ga content can be 0 or greater than 0) in the crystal as measured by XRF (X-ray Fluorescence) or AA/ICP (Atomic Adsorption/Inductively Coupled Plasma) must be equal to 0.7 (atomic charges per atom) or greater, preferably 0.9 (atomic charges per atom) or greater and even more preferably 0.95 (atomic charges per atom) or greater. It is also preferred that there not be a great excess of "metal cations" in the zeolite RHO materials. As such the ratio of average atomic "metal" cation charge to the atomic Al plus Ga content in the crystal as measured by XRF or AA/ICP must be less than 1.5 (atomic charges per atom), preferably less than 1.1 (atomic charges per atom) and even more preferably less than 1.01 (atomic charges per atom). In these systems the value of this ratio should always be close to 1.0 unless the materials are not washed well. Monovalent metal cations have one atomic charge per cation and examples include Li, Na, K, Rb, and Cs. Divalent metal cations have two atomic charges per cation and examples include Mg, Ca, Sr, and Ba. The amount of nonmetallic cations ($H^+$ or $NH4^+$) balancing the charge should be minimized. It is preferred that the ratio of the average nonmetallic cation charge to the atomic Al plus Ga content be less than 0.3 (atomic charges per atom), preferably less than 0.1 (atomic charges per atom) and even more preferably less than 0.05 (atomic charges per atom). For aluminosilicate versions of RHO, a criteria for having a low amount of nonmetallic cations can be stated as a having nonmetallic ion content of 0.2 or less of the exchange capacity of the material (exchange capacity is defined as the total moles of all cations/moles of aluminum). In a more preferred embodiment aluminosilicate versions of RHO have nonmetallic ion content of 0.1 or less of the exchange capacity of the material, and in an even more preferred embodiment aluminosilicate versions of RHO have nonmetallic ion content of 0.05 or less of the exchange capacity of the material. It should be noted the $H^+$ nonmetallic cations could be generated from protons transported into the crystal from exchange solutions, low pH water washes or exchange solutions where the pH <7.0, or the use of $NH_4$ ion exchange followed by the removal of $NH_3$ upon heat treatment or desorption in the process.

In the synthesis of zeolite RHO using exclusively inorganic cations to form the structure, i.e. Na, Cs, the bulk composition of resulting zeolite RHO product ranges from $SiO_2/Al_2O_3$ ratios of 4 to 14 (Si/Al of 2 to 14), with the more preferred ranges being from 5 to 7 (Si/Al of 2.5 to 3.5). Upon the use of other structure directing agents, i.e. quaternary ammonium containing molecules (mono, di, or tri quaternary), the $SiO_2/Al_2O_3$ ratio is larger ranging from infinite to 40. In the case of the SDA (structure directing agent) containing syntheses, the SDA and cations will balance the charge in the structure. Upon decomposition of the SDA, a proton will balance the charge in the framework which may exceed the values above. Upon the exchange with monovalent, divalent, or trivalent cations the above exchange capacity limitations could be reached.

Individual zeolite RHO crystal sizes that provide fast kinetic for water transport range from 0.05 microns to 40 microns, preferably from 0.1 microns to 15 microns and even more preferably from 0.2 microns to 5 microns. As-synthesized crystals can be intergrown or clumped and the size specification denoted herein applies to individual crystallites. The kinetic water transport rate is set by the crystal size and the diffusion constant for water.

As utilized herein, the term "cationic zeolite RHO" (or equivalently "cationic RHO zeolite") as is defined in its broadest terms is a RHO framework zeolite with at least one metal cation selected from the Group 1 and Group 2 elements (new Group 1-18 IUPAC numbering), with a ratio of average atomic metal cation charge to the atomic Al plus Ga content in the crystal as measured by XRF or AA/ICP is from 0.7 (atomic charges per atom) to 1.5 (atomic charges per atom). As an example, if the 1 $Cs^+$ cation per aluminum atom with no Ga atom, the average atomic metal cation charge is 1. Alternatively, if there is 0.5 $Ca^{2+}$ cation per aluminum atom with no Ga atom, then the average atomic metal cation charge is 1. In preferred embodiments, the cationic zeolite RHO comprises at least one metal cation selected from Li, Na, K, Rb, Cs, Mg, Ca, Sr, and Ba. In a preferred embodiment, the at least one metal cation is selected from Li, Na, K, and Cs, and more preferably, the at least one metal cation is Cs. In other preferred embodiments, the cationic zeolite RHO comprises at least two metal cations selected from Li, Na, K, Rb, Cs, Mg, Ca, Sr, and Ba. In a preferred embodiment, one of the at least two metal cations is Cs. In another preferred embodiment, the cationic zeolite RHO comprises at least two metal cations selected from the combinations of NaCs, KCs, and LiC.

In particular, the cationic zeolite RHO can be useful in removing water from feed streams (dehydration) wherein the water content is at least about 10 ppm (by volume or mole fraction), preferably at least about 100 ppm (by volume or mole fraction), and even more preferably, and even more preferably at least 250 ppm (by volume or mole fraction). As previously mentioned, in a preferred embodiment the swing adsorption process in which the zeolite RHO is utilized to rigorously dehydrate the feed stream producing a product stream that contains less than 10 ppm (mole fraction) of water, more preferable less than 1 ppm (mole fraction) of water, and even more preferably less than 0.1 ppm (mole fraction) of water. In another preferred embodiment the feed stream contains $CO_2$. In this embodiment, the $CO_2$ content of the feed stream is at least about is at least about 50 ppm (by volume or mole fraction), more preferably the $CO_2$ content of the feed stream is at least about is at least about 100 ppm (by volume or mole fraction) of $CO_2$, and even more preferably the $CO_2$ content of the feed stream is at least about is at least about 2500 ppm (by volume or mole fraction). In some embodiments, the feed stream may also comprise hydrocarbons, and the method herein are utilized to dehydrate the hydrocarbon containing feed stream. In particular embodiments, the hydrocarbon may be natural gas. The feed stream may also be comprised of methane, ethane or a combination thereof. In particular embodiments, the feed stream may contain at least 50 wt % hydrocarbons, or more preferably, at least 90 wt % hydrocarbons. It has been discovered that the selectivity of zeolite RHO is such that the swing adsorption dehydration process can be conducted using this zeolite to remove water from a hydrocarbon containing feed stream in a manner such that at least 90 wt % of the hydrocarbons present in the feed stream remain present in the product gas from the swing adsorption process, more preferably at least 95 wt % of the hydrocarbons present in the feed stream remain present in the product gas from the swing adsorption process, and even more preferably, at least 98 wt % of the hydrocarbons present in the feed stream remain present in the product gas from the swing adsorption process. This can be achieved while dehydrating the hydrocarbon containing feed stream to less than about 10 ppm mole fraction, whether or not acid gas conditions are present in the feed stream. It also been found that the cationic zeolite RHO possesses very rapid water kinetics which make it particularly advantageous for use as an adsorbent in rapid cycle swing dehydration processes.

In performing swing adsorption processes the zeolite RHO crystals are incorporated into a contactor that can be in the form of a structured contactor or unstructured (pelletized) contactor. Several patents teach ways of incorporating zeolite crystals into contactors usable in a swing adsorption processes. When the zeolite is formulated into a contactor for a swing adsorption process, it may be bound together or held together in a coating with inorganic oxides, metals, other zeolites, other microporous materials such as MOFs, carbons, or polymers. In some instances the crystals are bound into the form of a pellet. In other instances the crystals may be coated onto the surface of a monolith with the aid of a binding agent. In other instances the crystals are grown on the surface of a monolith. In other instances the crystals are extruded with a binding agents to form a monolithic structure. In preferred embodiments the mass of cationic zeolite RHO in the adsorbent bed of the contactor or contactors used in the swing adsorption dehydration process is more than 2 wt %, preferably more than 20 wt % and even more preferably greater than 50 wt % of the total adsorbent bed materials.

It has been found (as shown by the testing in the examples herein) that molecular sieve zeolite A which is commonly used for swing adsorption processes for dehydration degrades very rapidly under wet acidic atmospheres (i.e., a feedstream containing with $CO_2$ and water), especially in temperature swing adsorption (TSA) cycles, including rapid cycle temperature swing adsorption (RCTSA) cycles. The discoveries and disclosures herein provide for an alternative dehydration adsorbent (a cationic zeolite RHO) with superior hydrothermal stability for wet $CO_2$ feed as compared to zeolite A.

Preparation #1 of NaCs—RHO Zeolite

A zeolite NaCs-Rho was synthesized by the following preparation technique. 39.5 g of NaOH was dissolved in 25 g of water. 43.1 g of 50% CsOH was added with stirring to the NaOH solution resulting in a clear solution. 25.5 g of C-31 Alcoa ($Al(OH)_3$, aluminum trihydrate) was added to the Na—Cs solution. This mixture was brought to a mild boil with stirring to dissolve all of the $Al(OH)_3$. A clear Na—Cs—Al solution resulted which was then cooled to room temperature. 272.6 g of Ludox, HS-40 (colloidal silica) was mixed with 25 g of water in a Teflon bottle. The Na—Cs—Al solution was slowly added to the colloidal silica solution with stirring. The final mixture was brought up to 500 g with water and stirring. This final mixture was white and pasty. The mixture was aged at approximately ambient conditions for 4 days. The resulting thick mixture was shaken then placed in an 85° C. oven for 4 days under static conditions. The sample was filtered, washed then dried at 115° C.

Figure 15:
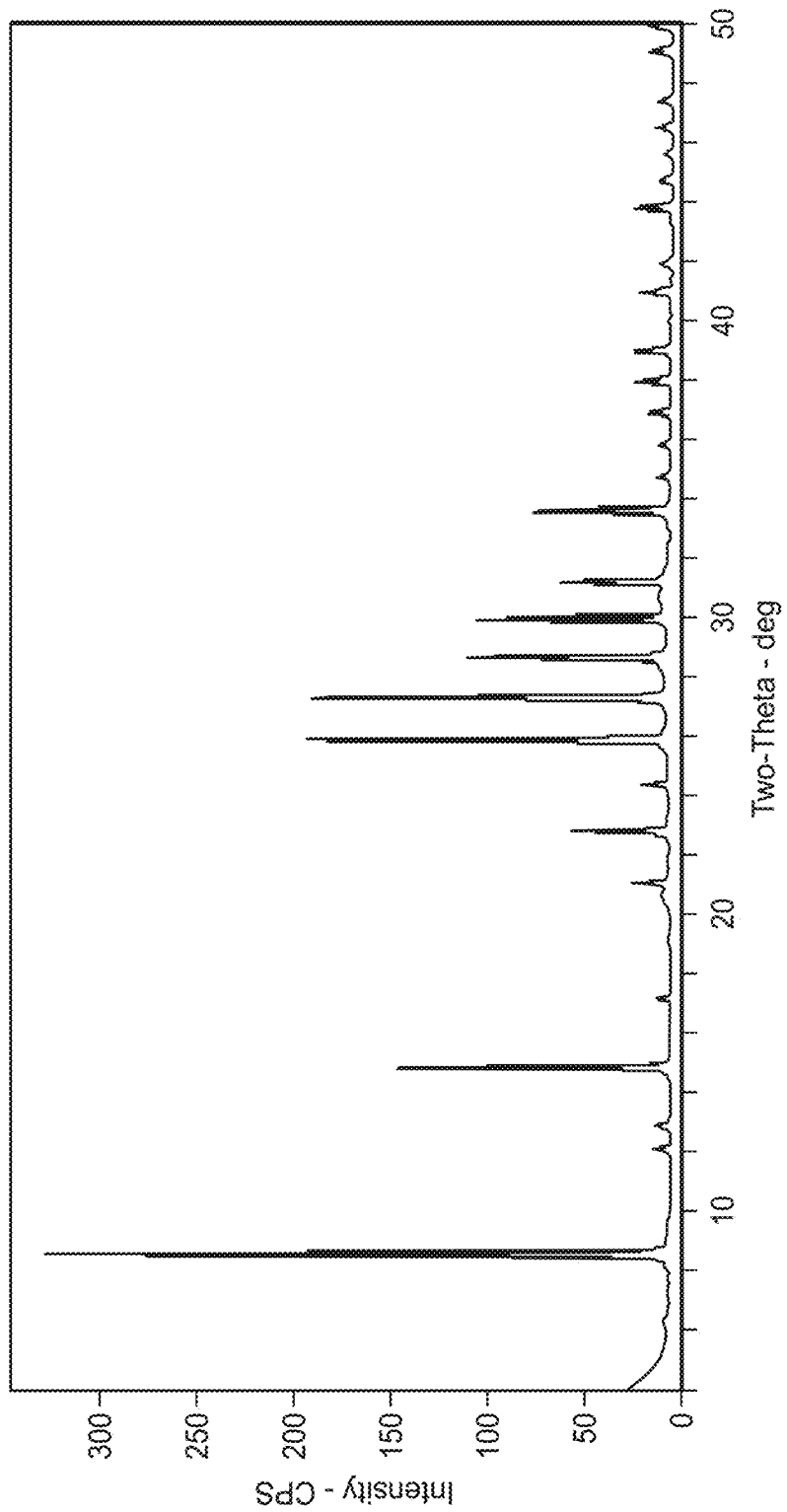
FIG. 15 is a PXRD pattern for a synthesized NaCs—RHO disclosed herein.

A powder x-ray analysis (PXRD) was taken of the white powder using a D8 Bruker Endeavor analyzer and the PXRD pattern was analyzed using Jade 9 commercial software. The PXRD pattern matched that of NaCs—RHO. The PXRD pattern for the synthesized NaCs—RHO is shown in FIG. 15. The peak intensities resulting from the PXRD are shown in Table 1 below.

TABLE 1

Peak PXRD intensities for NaCs-RHO

| 2-Theta | d(Å) | Height (CPS) | Height % |
|---------|--------|--------------|----------|
| 8.548   | 10.2929 | 321.8       | 100      |
| 14.87   | 5.9527  | 141.1       | 43.8     |
| 21.074  | 4.2122  | 19.1        | 5.9      |
| 22.772  | 3.9018  | 49.7        | 15.4     |
| 25.864  | 3.442   | 184.6       | 57.4     |
| 27.282  | 3.2662  | 182.7       | 56.8     |
| 28.64   | 3.1143  | 102.2       | 31.8     |
| 29.936  | 2.9824  | 94.6        | 29.4     |
| 31.191  | 2.8652  | 53.4        | 16.6     |
| 33.566  | 2.6677  | 69.7        | 21.7     |
| 37.931  | 2.3701  | 18.3        | 5.7      |
| 38.949  | 2.3105  | 18.9        | 5.9      |
| 40.925  | 2.2034  | 16.2        | 5        |
| 43.76   | 2.067   | 19.4        | 6        |
| 49.041  | 1.8561  | 13.5        | 4.2      |

Figure 1B:
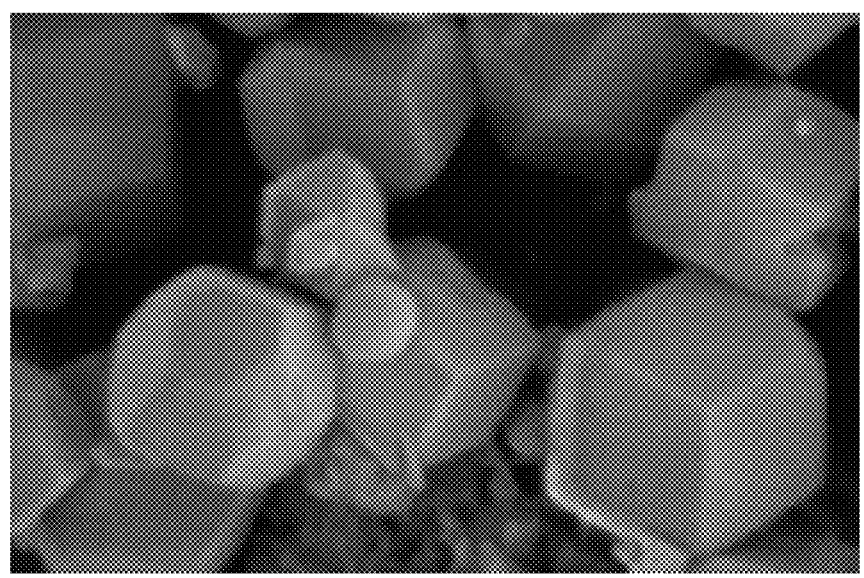

A compositional analysis confirmed the following composition of the zeolite crystals: Al: 8.00 wt %, Cs: 24.90 wt %, Na: 4.03 wt %, Si: 24.70 wt %. Si/Al: 2.97, Na/Cs: 0.94, (Na+Cs)/Al: 1.22. SEM images using a Hitachi S-4500 field emission scanning electron microscope (FE-SEM) indicated that the crystals size ranged from 0.3 to 0.45 μm. and the images of the crystals at different magnification levels (magnification scales as shown in figures) are shown in FIGS. 1A & 1B, respectively. In other preferred embodiments, the crystal size of the cationic RHO zeolite may be from about 0.3 to about 5.0 μm, or about 0.3 to about 3.0 μm, or about 0.3 to about 1.0 μm. Other NaCs—RHO zeolite samples were synthesized using alternate alumina sources (instead of the $Al(OH)_3$ illustrated in this example) such as aluminum foil, Al (foil), and sodium aluminate, $NaAlO_2$. NaCs—RHO was also fabricated using varying inductions times ranging from 0-7 days and temperatures ranging from 85-100° C. as well as in static systems and stirred systems up to 250 RPM. The stirred systems tended to produce somewhat larger NaCs—RHO crystals as compared to the static systems. When RHO seeds were added to a stirred reaction the morphology of the crystals changed. All of the samples utilizing these alternate synthesis methods showed good stability in dehydration studies.

EXAMPLE 1

Stability Screening

Figure 2:
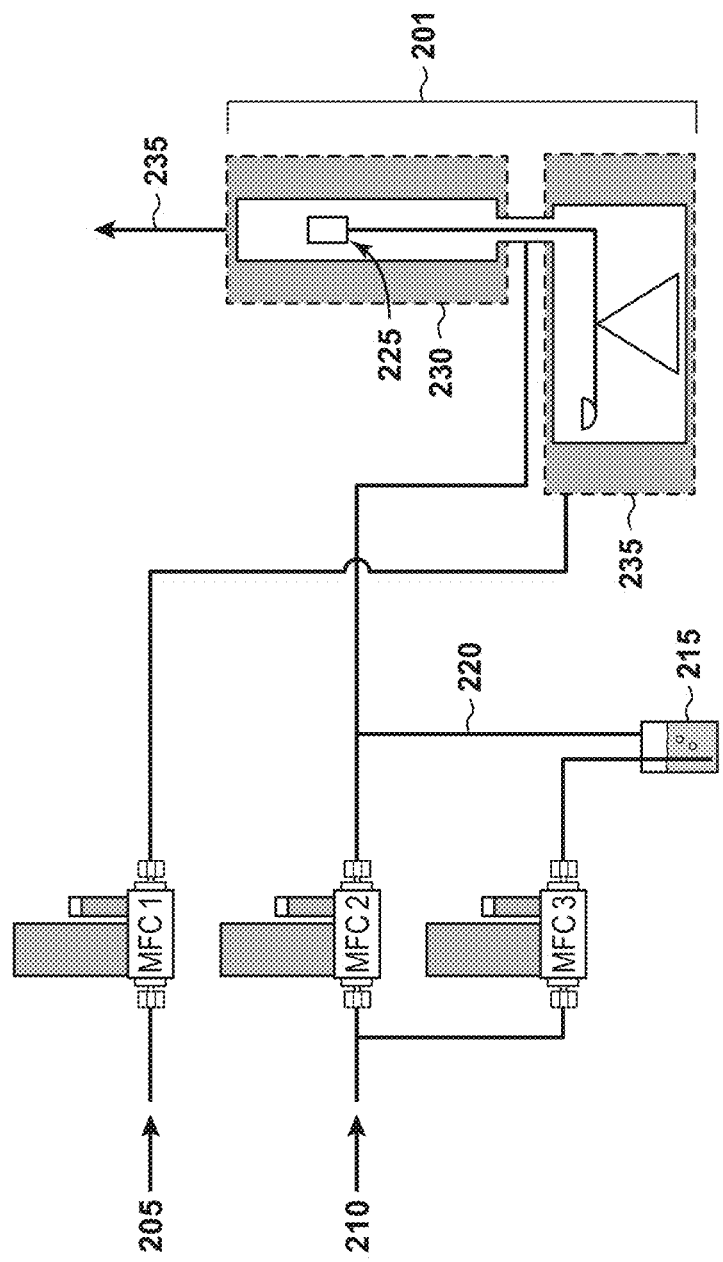
FIG. 2 is a schematic of a testing apparatus and arrangement used in the stability screening tests.

The stability screening test was been carried out using a commercial thermal gravimetric analysis (TGA) instrument 201. A schematic of the testing apparatus and arrangement is shown in FIG. 2. A feed stream of carbon dioxide ($CO_2$) 205, nitrogen ($N_2$) 210, and water ($H_2O$) 215 (via an entrained $N_2$ stream 220), was controlled at a set flow rate via mass flow controllers MFC1, MCF2 and MCF3 as shown. A sample of the zeolite to be tested was placed in a sample holder 225 within the oven 230 wherein the temperature could be controlled. The feed stream mixture was passed through the oven 230 containing the sample holder 225 and then vented 235. Depending on whether the sample was being simulated in an adsorption or desorption step, the sample weight changed accordingly and was continuously monitored through the microbalance 235. The oven temperature was been controlled in the way to mimic temperature swing cycles, i.e., using a high temperature for desorption/regeneration and low temperature for adsorption. The oven had the capability to increase temperature to 400° C. in approximately 30 seconds, but took about 20 mins to cool down to 35° C. The sample was continuously exposed to various temperature cycles, and the performance of the sample was been evaluated by one point $H_2O$ uptake at 30° C., which has been carried out before and after cycle treatments with in-situ regeneration at 400° C. for 30 mins. By comparing the $H_2O$ uptake capacity measured at beginning and the final capacity after nth temperature swing cycles, the degradation of adsorbents was evaluated for the wet $CO_2$ feed. The feed gas (or feedstream) was a wet $CO_2$ stream formed by mixing $CO_2$ with wet $N_2$ stream (see FIG. 2). All the testing are carried by running water concentration (5000 ppm at 1 bar) with $CO_2$ (0.7 bar $CO_2$ balanced with $N_2$) and temperature cycles from 35° C. to 400° C. These operating conditions were chosen to expedite the degradation process using severe conditions to evaluate stability in relatively short time run, instead of months or years operation time.

Figure 3:
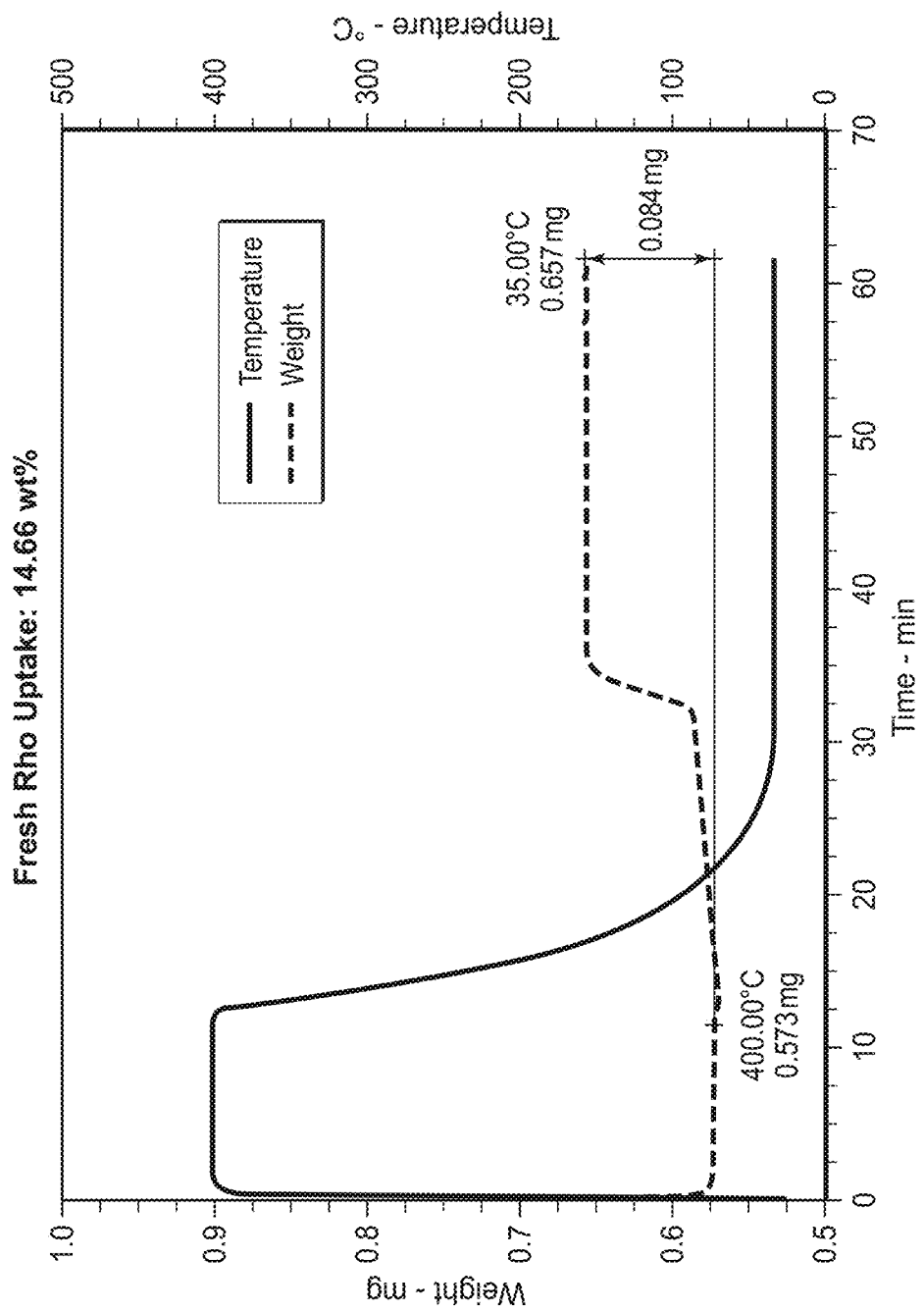
FIG. 3 is a graph showing initial water uptake at 35° C. after sample regenerated at 400° C. for a fresh NaCs—RHO sample, the partial pressure of water is ~0.0042 bar.

The NaCs—RHO crystals were tested over multiple cycles under these wet $CO_2$ conditions. The initial water uptake for the NaCs—RHO sample was measured before the cycle experiments. FIG. 3 shows the sample weight and the temperature changes as a function of time for the fresh NaCs—RHO sample. The sample was regenerated at 400° C. for 10 mins with 25 sccm (standard $cm^3$/min) flow of nitrogen passing through, and then cooled down to 35° C. A 5 sccm flow of nitrogen was added through a water bubbler at room temperature to measure water uptake. Balance of flow in the TGA was 2 sccm with $N_2$, so the partial pressure of water was about 0.0042 bar. The water uptake on the fresh NaCs—RHO was measured at 0.082 mg based on the 0.573 mg fresh sample weight. This amounted to a water uptake of 14.66% by weight of zeolite under these conditions.

Figure 4:
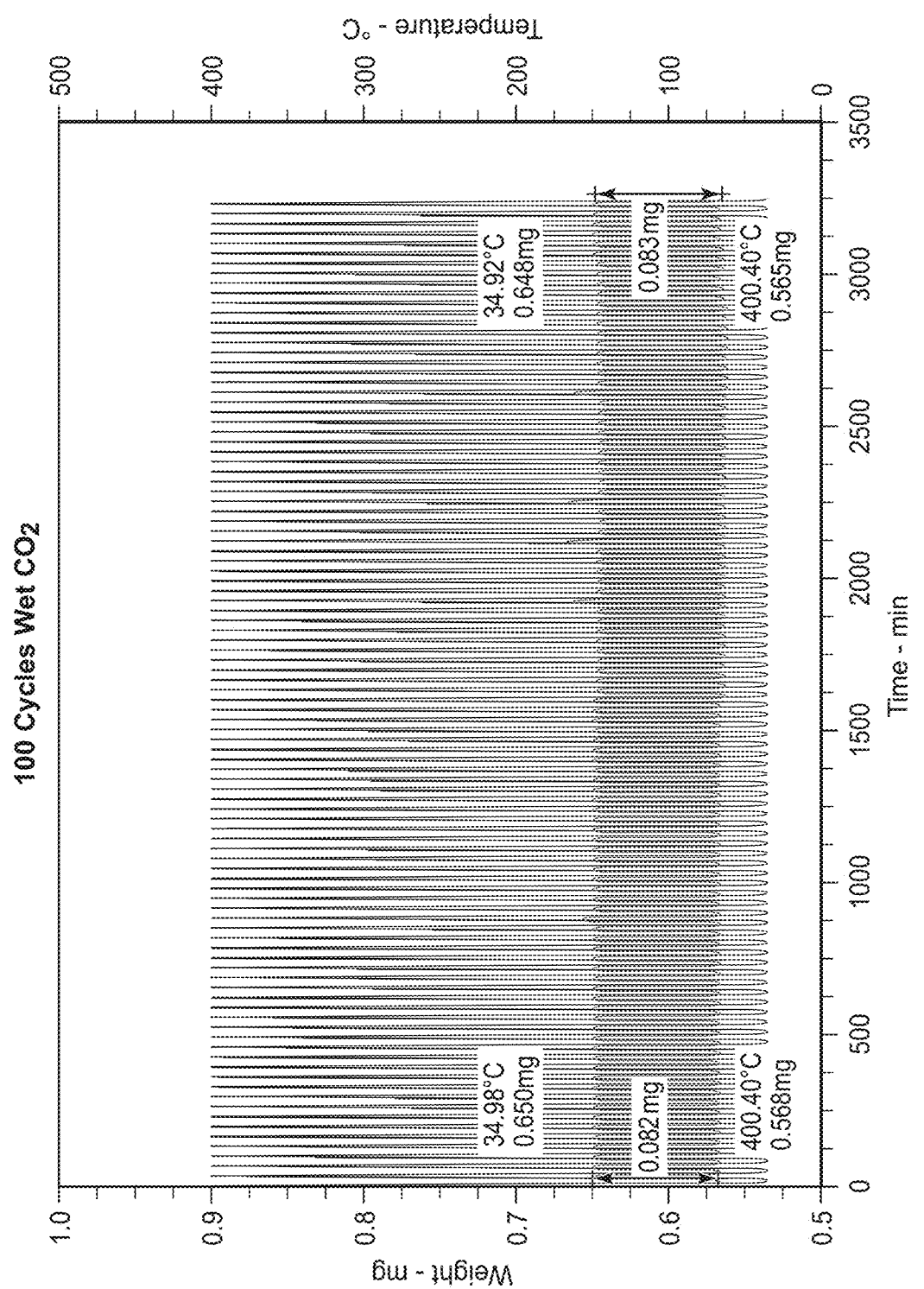
FIG. 4 is a graph showing a NaCs—RHO sample weight and the temperature changes as a function of time for 100 adsorption/desorption temperature cycles under wet $CO_2$ atmosphere conditions.
Figure 5:
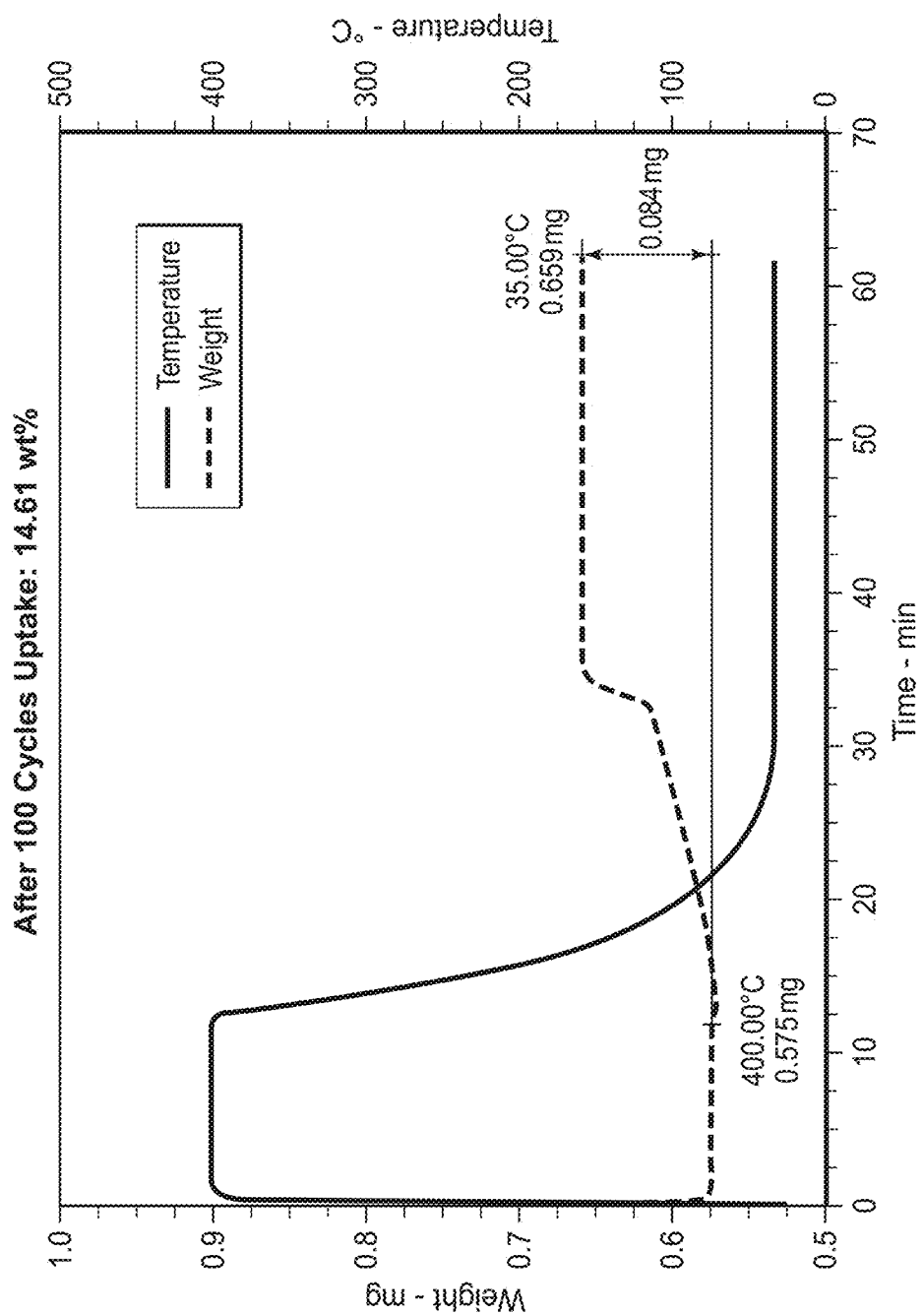
FIG. 5 is a graph showing the water uptake at 35° C. after sample regenerated at 400° C. for the NaCs—RHO sample after the 100 adsorption/desorption temperature cycles shown in FIG. 4. The partial pressure of water is ~0.0042 bar.

This NaCs—RHO sample was then run through 100 cycles under wet $CO_2$ atmosphere with temperature cycling from 35 to 400° C., with a typical full adsorption/desorption cycle lasting approximately 30 minutes. During adsorption step, the sample was exposed to a mix of flow including 20 sccm $CO_2$, 2 sccm dry $N_2$ and 5 sccm $N_2$ bubbling through a water bubbler to saturated at room temperature. During desorption step, the sample was exposed to mixed gases of 20 sccm $CO_2$ and 2 sccm $N_2$ at 400° C. FIG. 4 shows all temperature cycling and related weight change following temperature change. The temperature and sample weight of the first cycle and the last cycle has been marked in the plot. The uptake is 0.082 mg for wet $CO_2$ in the first cycle, and it is same for the last cycle of 0.083 mg. This suggests no degradation of the NaCs—RHO sample under multiple wet $CO_2$ atmosphere cycles. Furthermore, the water uptake was measured again at the end of the 100 cycles to give accurate evaluation of water capacity for the sample. The results are shown in FIG. 5. Here, it can be seen that the water uptake at the end of the 100 cycles was 14.61%, which was essentially the same as the initial water uptake 14.66% (i.e., within 1% deviation). Thus it was discovered that no degradation occurred for the NaCs—RHO after 100 cycles under wet $CO_2$ atmosphere conditions.

Figure 6:
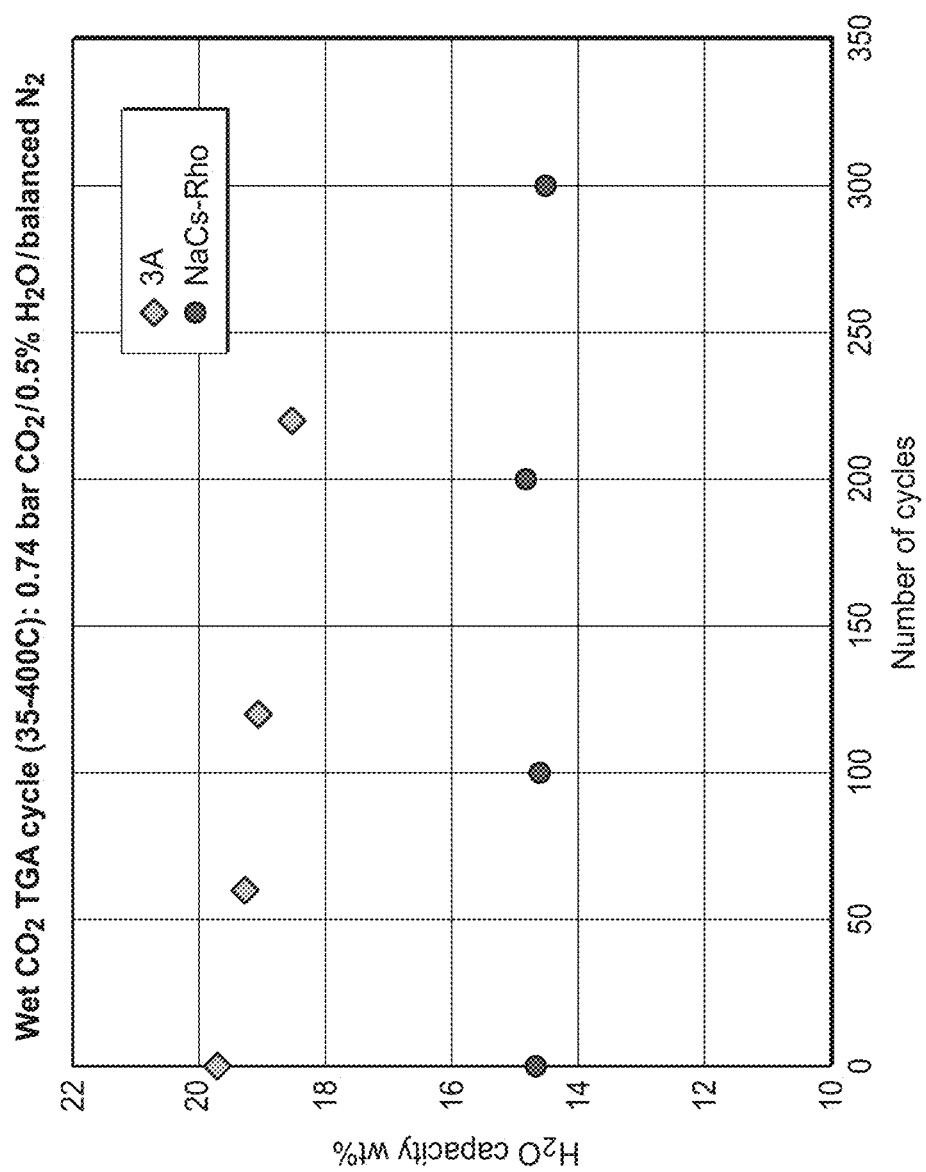
FIG. 6 is a graph showing the results measuring $H_2O$ capacity vs. the number of adsorption/desorption temperature swing cycles under wet $CO_2$ atmosphere conditions of comparative testing of a Zeolite 3A and a NaCs—RHO zeolite.
Figure 7:
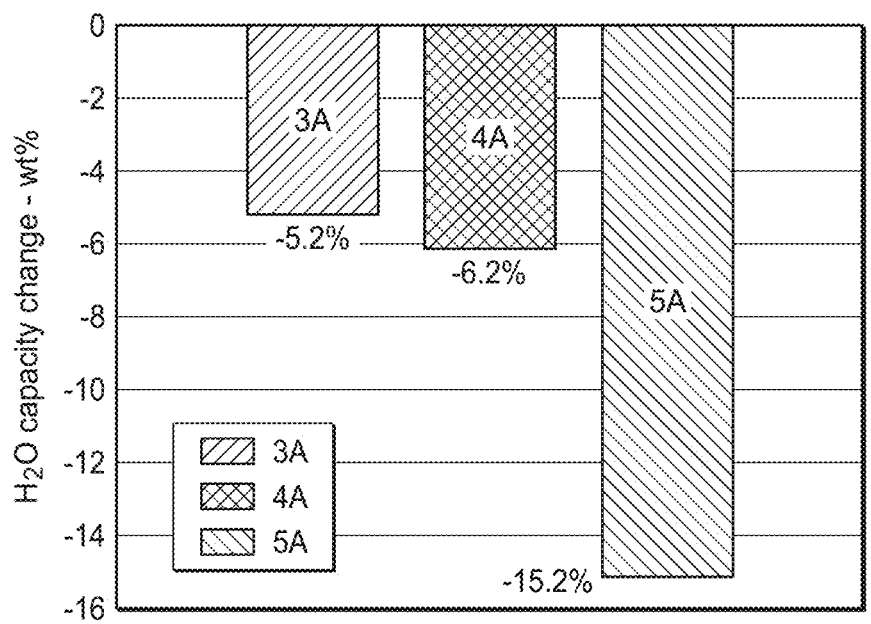
FIG. 7 is a graph showing the results measuring $H_2O$ capacity loss for three (3) LTA zeolites (3A, 4A, and 5A) after 60 adsorption/desorption cycles under the same adsorption cyclic operating conditions and wet $CO_2$ atmosphere conditions except desorption with wet $CO_2$ instead of dry $CO_2$ in previous cycle testing. Wet $CO_2$ desorption conditions accelerated degradation as compared to dry $CO_2$ desorption condition.

Surprised by the results from the initial testing of the NaCs—RHO zeolite under wet $CO_2$ atmosphere conditions, this testing was continued for more cycles. This testing procedure provides a quick way to evaluate material stability at expedited conditions. By controlling the same operating conditions and testing procedures, commercial 3A, 4A and 5A LTA zeolite crystals were tested and evaluated as comparison to the NaCs—RHO under the same wet $CO_2$ atmosphere conditions and cycles noted for the NaCs—RHO testing above. The results of this comparative testing for the NaCs—RHO and the Zeolite 3A are shown in FIG. 6. As can be seen, the Zeolite 3A has a higher initial water capacity than the NaCs—RHO zeolite. However, as can be seen in FIG. 7, the Zeolite 3A is not stable over continued adsorption/desorption cycles under the wet $CO_2$ atmosphere conditions. In FIG. 6 it can be seen that the Zeolite 3A lost a significant amount of its initial water capacity over only 220 cycles. As can be seen in FIG. 6, the Zeolite 3A showed a clear trend to a near linear decrease in capacity as a function of the # of adsorption/desorption cycles. As such, the water adsorption of the LTA zeolites are expected to significantly deteriorate over a short life span of adsorption cycles conditions under wet $CO_2$ cycle conditions.

In contrast, as can be seen in FIG. 6, the NaCs—RHO zeolite sample was subjected to a total of 300 adsorption/desorption cycles under wet $CO_2$ atmosphere conditions and showed no significantly measurable loss of water capacity when subjected to the same adsorption cycles and wet $CO_2$ atmosphere conditions.

Based on this data, is estimated that the NaCs—RHO will be able to operate at least more than 4 to 5 times longer than the LTA zeolites in a typical commercial rapid swing adsorption process under wet $CO_2$ conditions. The degradation has correlation with cycle temperature and water content in feed condition. At higher regeneration temperatures and higher water loadings the samples show more degradation for the same number of cycles (i.e., the samples lost more capacity). To accelerate degradation in minimum cycles, the operating test conditions reported here used a high regeneration temperature at 400° C. and sample almost fully loaded with water (>10 mol/kg) when exposed to 0.7 bar $CO_2$. For conventional temperature swing cycle with LTA zeolites, the adsorbents bed are normally changed after approximately 2000 cycles. Giving the RHO material shows no degradation after 300 cycles at severe conditions, it should easily last more than 2000 cycle with a corresponding capacity drop less than 10% over 2000+ cycles.

In another TSA cycle experiment, the material stability for LTA zeolite structures were compared under the wet $CO_2$ atmosphere with temperature cycling from 35 to 400° C. The desorption process used wet $CO_2$ feed including 20 sccm $CO_2$ and 2 sccm $N_2$ balance and 5 sccm $N_2$ bubbling through water at room temperature. This is different compared to previous treatment using dry $CO_2$ conditions. The adsorption condition is same as previous treatment. The results of this testing are shown graphically in FIG. 7. Compared to the results in FIG. 6, all of the LTA zeolite structures showed more degradation over 60 adsorption cycles under wet $CO_2$ atmosphere conditions for both adsorption and desorption process. As can be seen in FIG. 7, with similar Si/Al ratios of 1, and increasing pore opening from 3A, to 4A, and to 5A the LTA zeolites show more degradation under wet $CO_2$ condition for temperature swing adsorption/desorption cycles under wet $CO_2$ atmosphere conditions. As can be seen in FIG. 7, the LTA zeolites are not be stable over continued adsorption/desorption cycles under the wet $CO_2$ atmosphere conditions. In FIG. 7 it can be seen that the Zeolite 3A lost 5.2% of its initial water capacity over 220 cycles, while Zeolite 4A lost 6.2% of its initial water capacity, and Zeolite 5A lost 15.2% of its initial water capacity over only 60 cycles. As can be seen in FIG. 7, all of the LTA zeolites showed a clear trend to a near linear decrease in capacity as a function of the # of cycles. As such, the water adsorption of the LTA zeolites are expected to significantly deteriorate over a short life span of adsorption cycles conditions under wet $CO_2$ cycle conditions. Accordingly, the higher initial capacity LTA zeolite structures show a high rate of degradation (water capacity loss) over multiple adsorption/desorption cycles under wet $CO_2$ atmosphere conditions.

EXAMPLE 2

Water Kinetics Testing

Under rapid cycle temperature swing and/or pressure swing conditions, the adsorption step may be on the order of just a few seconds. As such, the selected adsorbent generally operates under a "kinetic" separation regime. That is, that in conventional adsorption swing processes, the adsorption time is sufficient to allow the adsorption of the various feed stream components to come to an equilibrium state. These conventional adsorption swing processes generally have an adsorption time on the order of a few hours to a few days. However, under rapid cycle temperature swing and/or pressure swing conditions, the kinetics of the separation process are utilized as an advantage in the separation by selecting an adsorbent and adsorption conditions so that the kinetic adsorption (or diffusivity) selectively favors the desired component to be adsorbed (in this case, $H_2O$) over the component or components that are not desired for adsorption.

Kinetics of zeolite samples can be measured in the laboratory using ballistic chromatography. For quantification of fast diffusivity measurements, a variation of the chromatographic breakthrough technique may be utilized. In this technique, a small amount of sample (e.g., zeolite crystals) is placed in a packed bed of about 1 centimeter (cm) in lengths, and about 0.1 cm in diameter. The weight of the dry sample in the packed bed is accurately measured and depending on how the packed bed is loaded, the sample can range from between about 2 milligrams (mg) to about 20 mg. The sample placed into the packed bed can be composed of individual zeolite crystals or small aggregates of the crystals. For water vapor delivery helium gas stream is passed through a bubbler, which is maintained at a temperature lower than the temperature of the adsorption bed to avoid condensation. A mass spectrometer with a fast data acquisition is utilized to monitor the effluent concentration of the water vapors.

Typically, the gas velocity is on the order of about 30 centimeters per second (cm/s), and the corresponding gas residence time is very short). The response of the column is indicative of the equilibrium and kinetics of the adsorption process. If the kinetics of the sample are fast, a sharp breakthrough front appears at a time that is more than 30 seconds later than the time at which a front appears with no sample in the cell. The swing adsorption capacity of the sample at the point of breakthrough can be calculated from the time of breakthrough and can be directly calculated from the rate at which molecules are being fed into the bed.

To establish the intrinsic kinetics of the NaCs—RHO zeolite using ballistic chromatography, a small (e.g., 3 milligram (mg) to 10 mg) packed adsorbent bed of zeolite crystals was used to measure breakthrough in a short residence time. The tests were performed at ambient conditions, with the pressure drop in the column typically not exceeding ~1-4 bar, depending on the crystal size. The testing was performed by flowing helium gas through water.

Figure 8:
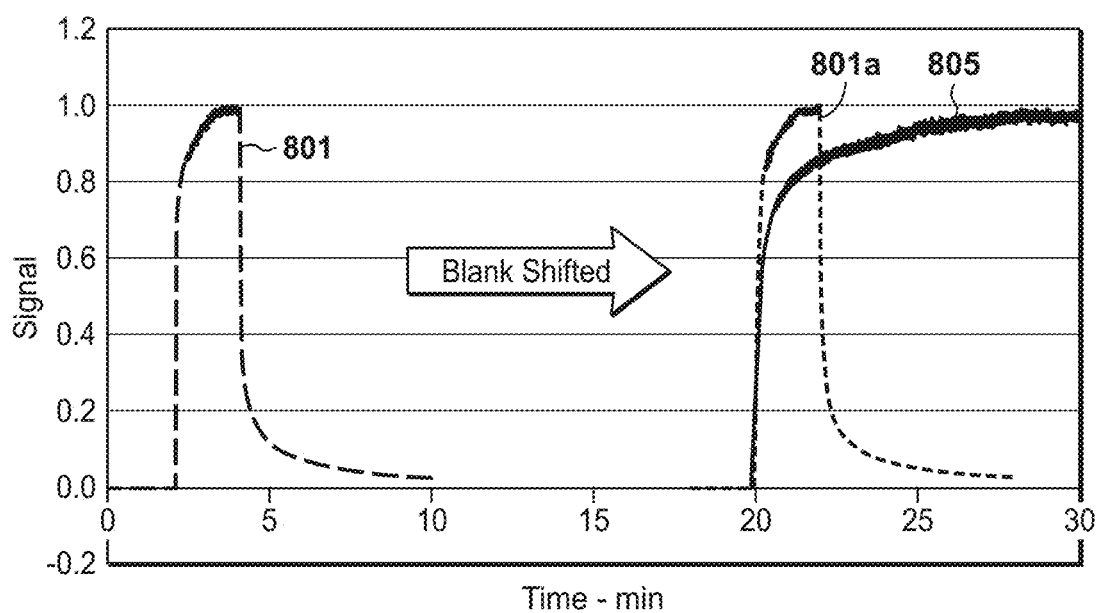
FIG. 8 is a diagram of the water breakthrough on a NaCs—RHO zeolite packed adsorbent bed.

FIG. 8 is a diagram of the water breakthrough on a NaCs—RHO zeolite packed adsorbent bed. The breakthrough curves of RHO samples at water concentration of about 3 percent (%) in a packed bed configuration along with the associated blank configuration. The response curve 801, which scale has been normalized to a value of 1.0, is for an empty bed containing no adsorbents (or "blank") to determine measurement response time, while the response curve 805 is for NaCs—RHO packed bed (shown along with shifted blank curve 801a—which a superimposed shifted version of response curve 801). As can be seen in FIG. 8, the NaCs—RHO zeolite data is relatively flat before the breakthrough front (starting at approximately 20 minutes), with no initial bleed through of water. Thus, by comparing response curves 801 and 805, it can be seen that the uptake of water is significantly faster than the residence time of the water in the sample beds, thereby confirming that the NaCs—RHO zeolite possess a high kinetic adsorption rate for water. Additionally, the slope of breakthrough curves of the experimental blank response curve (see shifted/overlaid curve 801a) and sample NaCs—RHO experimental response curve 805 are very comparable, which confirms that there is no appreciable slowdown of adsorption kinetics for water in the NaCs—RHO zeolite sample.

EXAMPLE 3

Long-Term Stability Testing

To test the stability of multiple adsorbent samples for many cycles of heating and cooling, a cyclic stability test apparatus was utilized. The test apparatus had the capability to test up to 8 samples each is in its own channel within a heating/cooling block. Samples are typically run in duplicates within each test as per results in FIGS. 9 and 10 for 3A and NaCs—RHO samples. For the testing examples below, the test apparatus was typically run as 4 samples in duplicate under controlled gas environments while cycling from cool to hot.

The test examples provided below, i.e., the "3A (LTA) Testing" and "NaCs—RHO Testing" of Example 3 below, were tested under cyclic conditions cycling between 30° C. to 350° C., with a typical full adsorption/desorption cycle lasting approximately 20 minutes. During the cool portion of the cycle, the zeolite samples (loaded as a small, approximately 25 mg sample contained in a 1 mm tall by 6 mm wide (pancake) bed with flow through gas) were each exposed to a 300 sccm flow of water saturated gas composed of 70% nitrogen and 30% carbon dioxide (plus the water content). Due to the bed and sample holder pressure drops under this moderately high gas flow, the saturator and the bed entry side was typically at approximately 2.5 bara pressure, with the bed exit side held at approximately 1 bara pressure. During the cool adsorption period (or stage), both water and $CO_2$ are adsorbed onto the bed. The adsorption period was held long enough to ensure that complete breakthrough of water had occurred by monitoring gas hydrometers in line with the exit side of each bed.

Following the cool adsorption portion of the experiment, the beds, contained in a single aluminum temperature control block were all rapidly heated to approximately 350° C. using resistive heater rods embedded in the aluminum block. The heating ramp-up period normally required less than 2 minutes to attain 350° C. To allow desorption of the adsorbed water and carbon dioxide, the samples were then held at 350° C. for an additional 60 seconds, followed by cooling of the temperature control block to 30° C. utilizing cold water flow through channels in the block. During both the heating and high temperature hold (desorption) periods, the gas flow through the samples was switched to 300 sccm of dry carbon dioxide. The cooling period (or stage) typically required approximately 4-5 minutes to reduce the temperature to stabilize at approximately 30° C. As the sample temperatures decreased below 100° C., the gas flow was switched again to the water saturated gas composed of 70% nitrogen and 30% carbon dioxide (plus the water content).

For the data disclosed below for the "3A Testing" and "NaCs—RHO Testing" of Example 3 according to the described test methods, approximately 3000 total cycles were performed with intermediate testing of the water adsorption capacity using an off-line TGA was performed approximately every 500 to 1000 cycles to determine the sample's water adsorption capacity relative the fresh adsorbents' initial water adsorption capacities. The TGA testing procedure was to heat the samples to 400° C. for a 2 hour drying period, followed by adsorbing water from a gas steam composed of 50% water saturated helium blended with 50% dry helium. The measured capacities were then reported in both absolute and "relative residual capacity."

Figure 9:
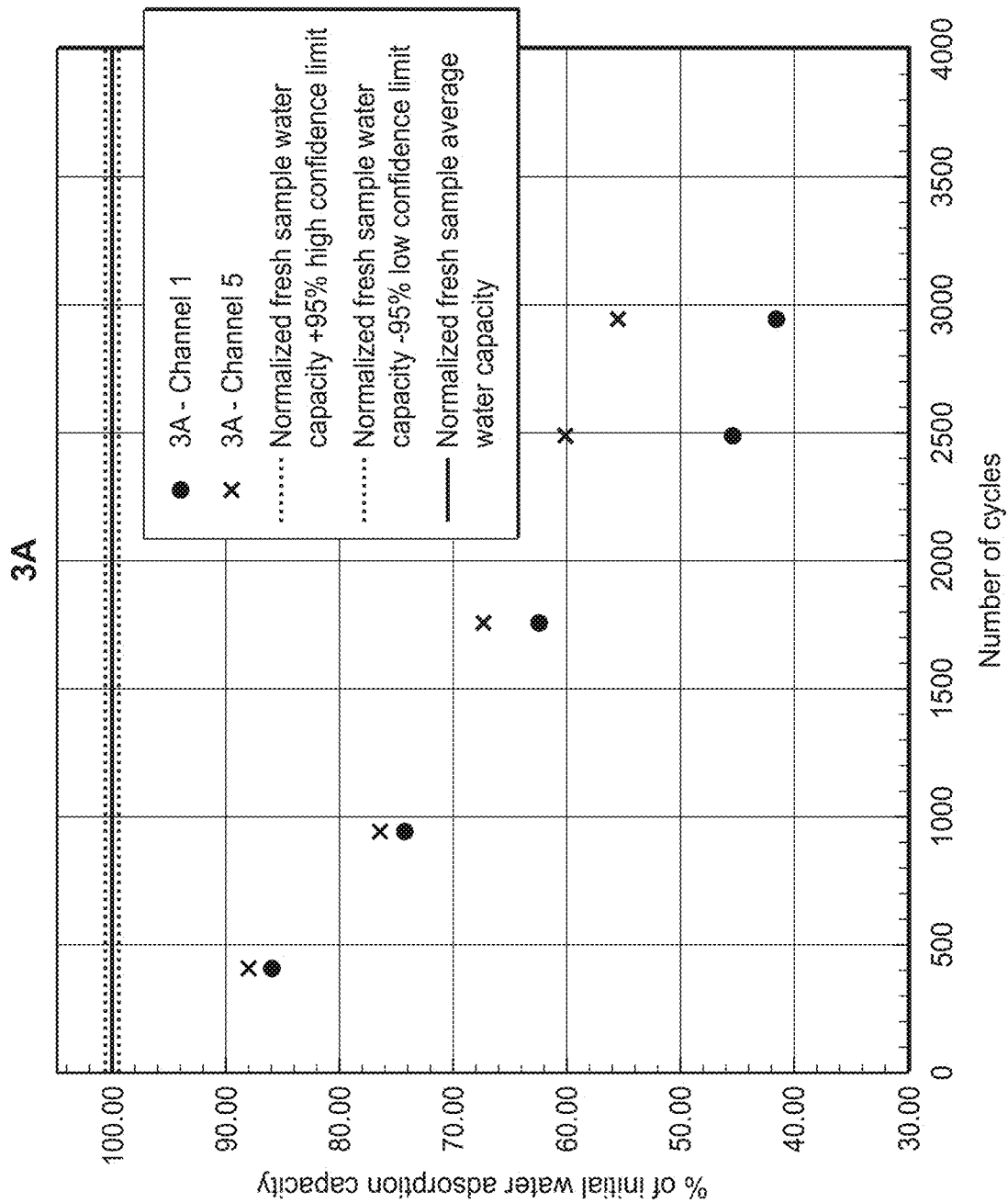
FIG. 9 is a graph showing the test results showing the water capacity loss for a Zeolite 3A (LTA) subjected to 3000 adsorption/desorption temperature swing cycles under wet $CO_2$ atmosphere conditions.

3A (LTA) Testing of Example 3:

As per the test methods described in Example 3 above, two samples of 3A zeolite were tested as described above to establish a base case for comparative testing. The results from these tests are shown in FIG. 9. The water capacity determined for the fresh 3A samples under the standardized TGA measurement conditions (above) was 23.47 wt. % based on the dry sample weight with a two sigma standard deviation of 0.16% based on 4 measurements. FIG. 9 shows the residual percent initial capacity over the course of approximately 3000 heating and cooling cycles for the two (2) 3A samples from the test apparatus (samples in Channels 1 and 5, respectively). It may be observed that the 3A samples lost between 44 and 58% of their initial water capacity.

As can be seen, such a deterioration in adsorption capacity for an LTA zeolite would require significant oversizing of the adsorption bed size to allow for the later life capacity loss. This would result in oversizing of associated equipment and additional volume costs for the zeolite adsorbent and related adsorbent bed construction materials, or would require significant downtime for frequent changing out of the adsorbent materials for adsorption swing processes under wet $CO_2$ conditions.

Figure 10:
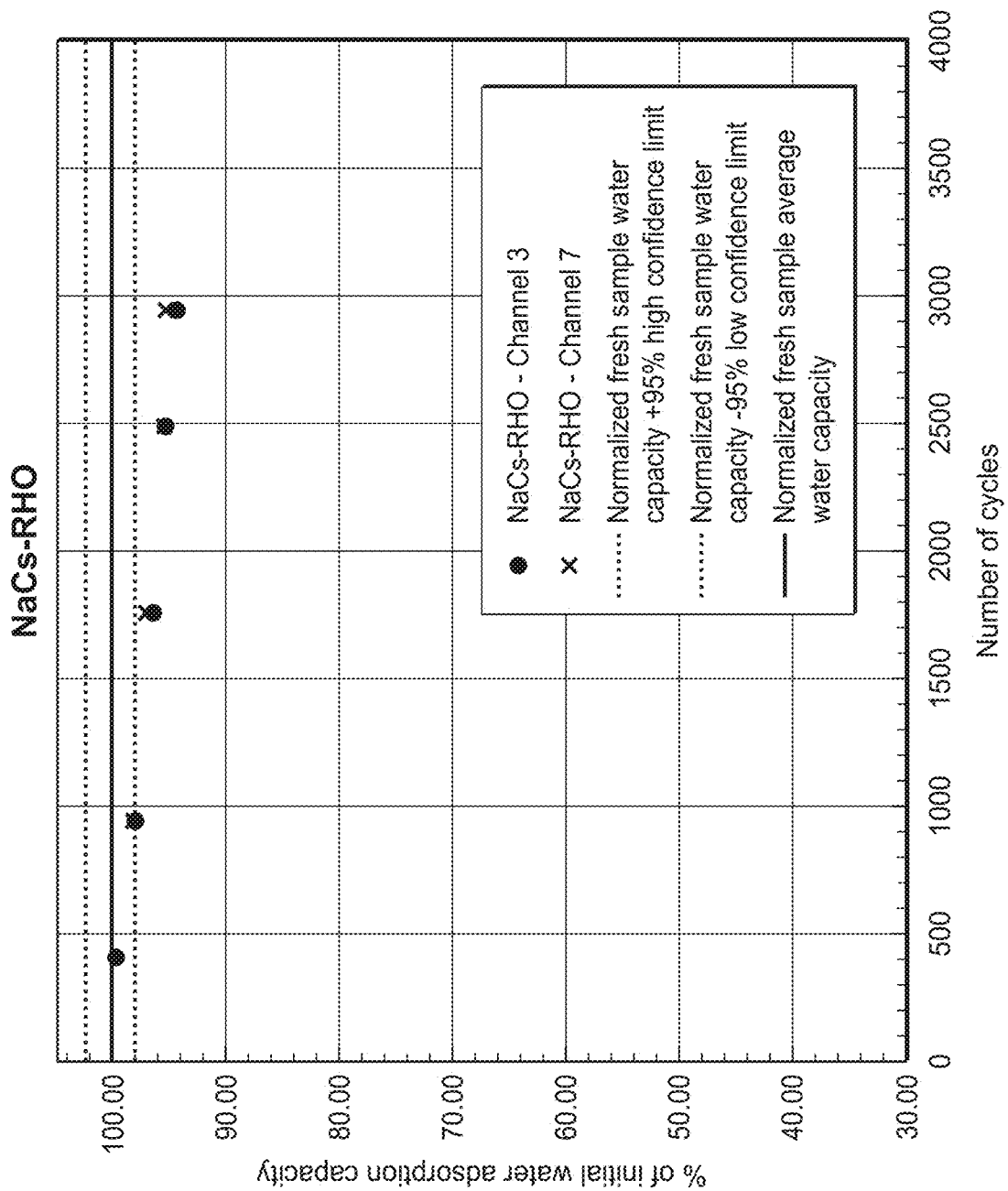
FIG. 10 is a graph showing the test results showing the water capacity loss for a NaCs—RHO zeolite subjected to 3000 adsorption/desorption temperature swing cycles under wet $CO_2$ atmosphere conditions.

NaCs—RHO Testing of Example 3:

As per the test methods described in Example 3 above, two (2) samples of NaCs—RHO zeolite were tested under the same conditions as the zeolite 3A testing above. The results from these tests are shown in FIG. 10. The water capacity determined for the fresh NaCs—RHO samples under the standardized TGA measurement conditions (above) was 15.75 wt. % based on the dry sample weight with a two sigma standard deviation of 0.34% based on 4 measurements. FIG. 10 shows the residual percent initial capacity over the course of approximately 3000 heating and cooling cycles for the two (2) NaCs—RHO samples from the test apparatus (samples in Channels 3 and 7, respectively). It may be observed that the NaCs—RHO samples lost only between 5 and 6% of their initial water capacity, an approximate 10× lower loss rate as compared to 3A zeolite under the same conditions.

As can be seen in FIG. 10 that, especially as compared to 3A (LTA) zeolite in FIG. 9, the NaCs—RHO is quite stable over a significant number of swing adsorption cycles modeling the desired duration of a commercial application (approximately 3000 heating and cooling cycles) between adsorbent change outs/replacements. As such, the NaCs—RHO zeolite enables the adsorption bed not to have to be oversized to accommodate for significant later life capacity losses. This improved stability leads to lower costs for the zeolite adsorbent and related adsorbent bed construction materials as it allows the adsorbent bed to run for a significantly larger number of adsorption/desorption cycles than the LTA zeolites. This also results in significantly reduced downtime for changing out of the adsorbent materials for adsorption swing processes under wet $CO_2$ conditions.

EXAMPLE 4

Water Isotherms for NaCs—RHO Zeolite

Figure 11:
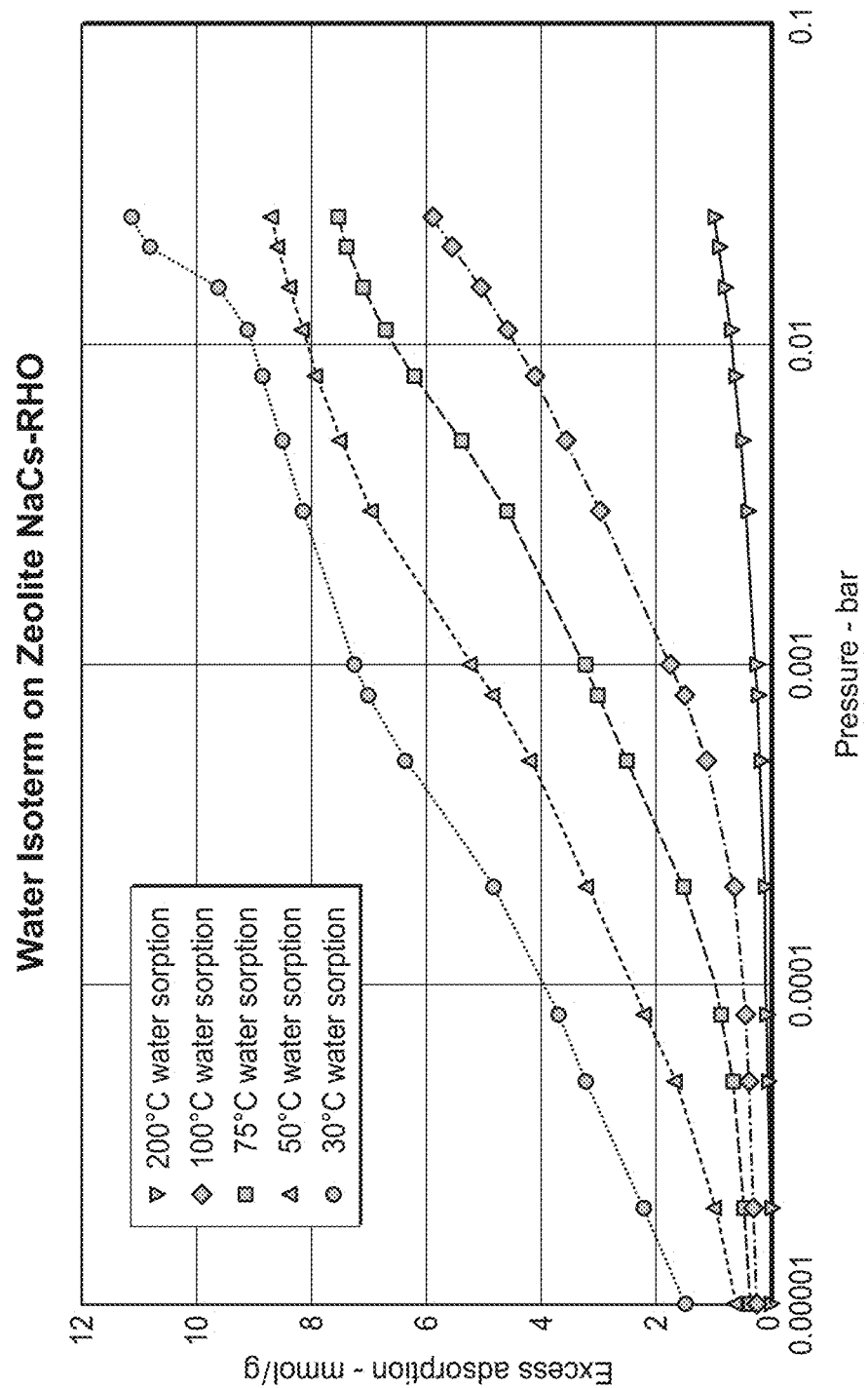
FIG. 11 is a graph showing the water capacity as a function of temperature and pressures for NaCs—RHO zeolite.

FIG. 11 shows water isotherms on NaCs RHO NaCs—RHO zeolite crystal (synthesized per examples herein) over temperature ranges (30° C. to 200° C.) and water pressure ranges (0.00001 to 0.05 bar). The wide range of temperature measurement provides data for design basis for a TSA cycle, and the wide range of pressure measurements additionally provides data for the design basis for deep dehydration cycles to sub ppm level additionally utilizing pressure swing. As water removal for LNG or NGL specifications typically has to meet 0.1 ppmv, water isotherms have been measured down to this range for design purposes.

Figure 12:
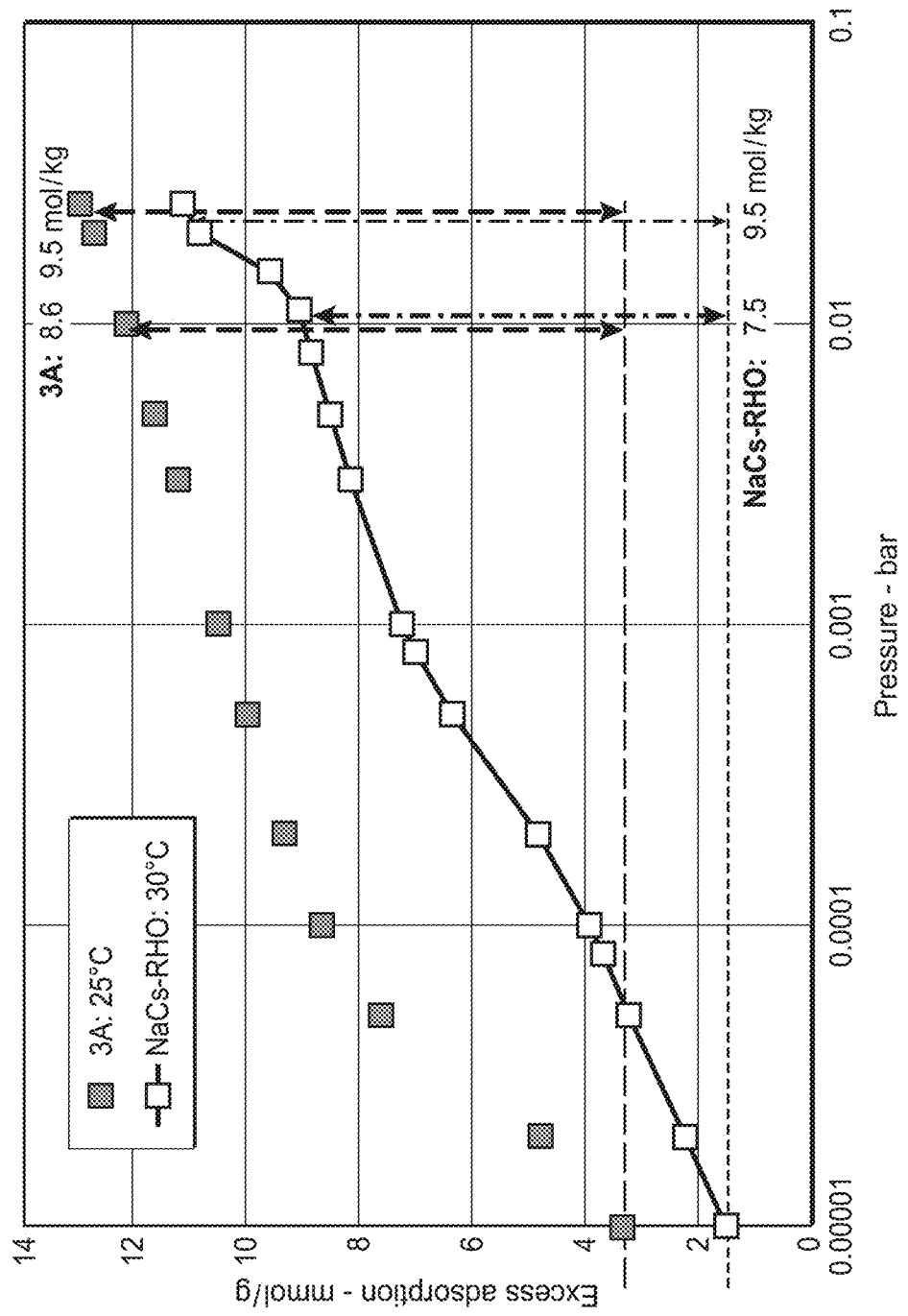
FIG. 12 is a graph showing the comparison of working capacity for pressure swing cycles between 3A and NaCs—RHO.
Figure 13:
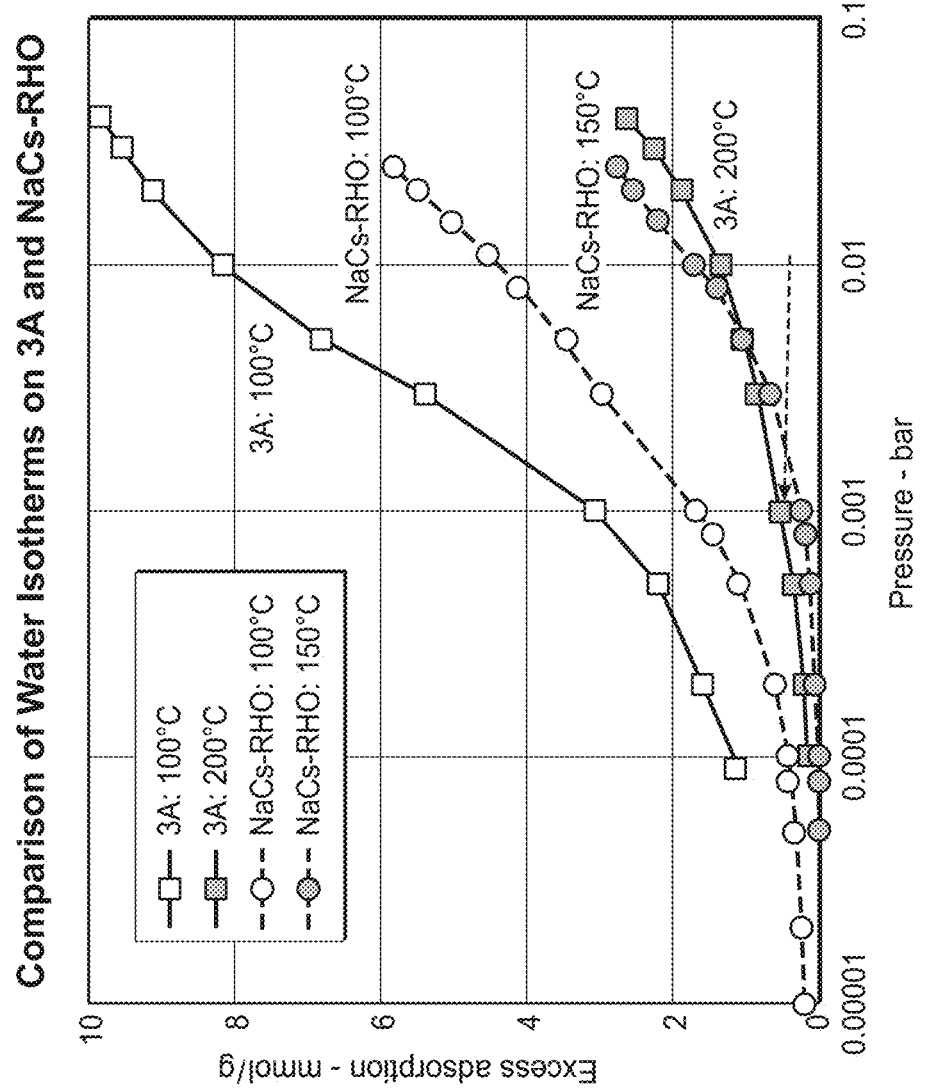
FIG. 13 is a graph showing the comparison of water capacity at high temperature for regeneration to clean the adsorbate between 3A and NaCs—RHO.

Even though water capacity on the NaCs—RHO is less than conventional LTA molecular sieves (3A, 4A, and 5A) at room temperature, however, the working capacity, which is defined as the difference of loading between water partial pressure at 0.01 bar and 0.00001 bar at room temperature, is ~7.5 mol/kg for NaCs—RHO compared to 8.6 mol/kg for 3A zeolite. As illustrated in FIG. 12, in this range, NaCs—RHO has a slightly less working capacity than the 3A zeolite; about 15% less observed for this pressure swing range. However, when comparing the working capacity for the water loading between 0.03 bar and 0.00001 bar at room temperature, both 3A and NaCs—RHO have a similar working capacity of about 9.5 mol/kg. FIG. 13 shows comparison of water isotherms of 3A and NaCs—RHO at high temperature for regenerating samples. For regeneration, NaCs—RHO shows an advantage compared to a conventional LTA molecular sieve. As an example, the water capacity for NaCs—RHO at 150° C. and 0.001 bar is less than that for 3A at 200° C. and 0.001 bar, which means NaCs—RHO is more easily regenerated at lower temperatures. This can save energy cost for regeneration, and more importantly, use of the NaCs—RHO greatly minimizes material degradation which occurs increasingly at higher temperature cycles.

EXAMPLE 5

Stability Comparison of NaCs—RHO to Typical Proton Form of RHO

Figure 14:
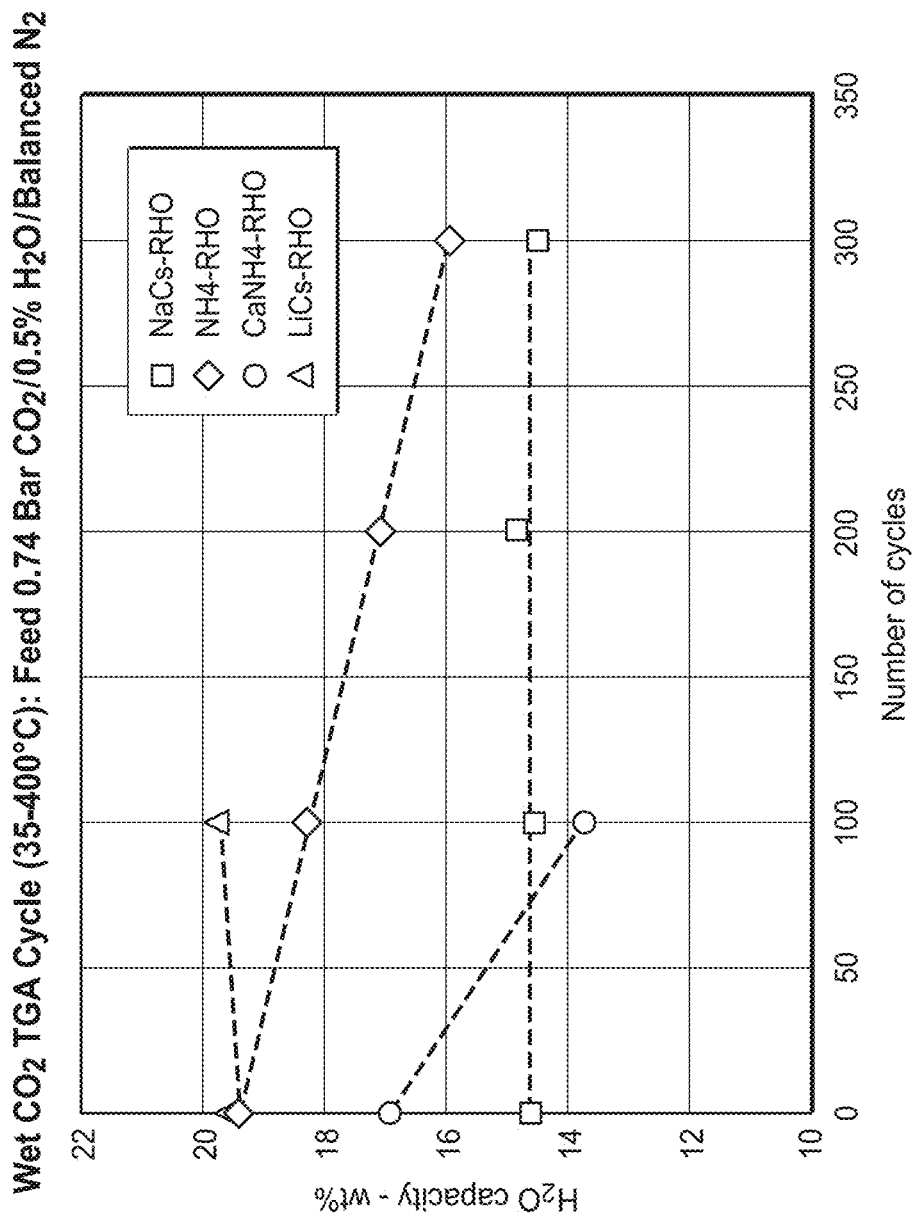
FIG. 14 is a graph showing the results comparing $H_2O$ capacity vs. the number of adsorption/desorption temperature swing cycles under wet $CO_2$ atmosphere conditions of LiCs—RHO, CaNH$_4$—RHO, NH$_4$—RHO, and NaCs—RHO zeolite.

Counter examples of $NH_4$—RHO and $CaNH_4$—RHO have been synthesized using similar steps. The $H^+$ could be generated from protons in the exchange solution or the use of $NH_4$ followed by the removal of $NH_3$ upon heat treatment or desorption in the process. With the same testing conditions used in Example 1 for NaCs—RHO, these proton forms of RHO show significant degradation under similar wet $CO_2$ cycle conditions. This example shows that not all RHO zeolites maintain high stability for dehydration process, especially when acidic gas is present. FIG. 14 illustrates that the testing of comparative sample of $NH_4$—RHO (proton form of RHO) shows a loss of water capacity of approximately 6% after only 100 cycles, and approximately 12% after only 200 cycles, and approximately 18% after only 300 cycles. The comparative sample of $CaNH_4$—RHO (partially exchanged proton form of RHO) shows an approximate 19% water capacity loss after only 100 cycles. In comparison, the NaCs—RHO (i.e., a cationic zeolite RHO of the present disclosure) shows almost no loss of water capacity after 300 cycles.

Since RHO can be ion-exchanged with other alkali metals, an example with Li form RHO (LiCs—RHO) has been synthesized and has been tested under the same conditions. As seen in Na form RHO, the LiCs—RHO shows great stability as well as compared to the proton forms of RHO. No loss of water capacity has been observed in LiCs—RHO after 100 cycles for the same testing conditions in Example 1. Si/Al=6, Li/(Li+Cs)=0.94, (Li+Cs)/Al=0.84 as measured via ICP. FIG. 14 shows a comparison of water adsorption capacity stability among these different forms of RHO under the same wet $CO_2$ cycle conditions.

EXAMPLE 6

Preparation #2 of NaCs—RHO Zeolite

This example provides another scalable synthesis route for to obtain zeolite RHO materials that are stable for swing adsorption dehydration processes. In particular, it is stable for processes used to dehydrate feeds that contain acid gases.

159.2 g of 50 wt % NaOH was added to 236.0 g of distilled water. 49.6 g of CsOH monohydrate was added to 38.9 g of distilled water. 58.2 g of dried aluminum hydroxide gel was dissolved in the NaOH solution. A cesium hydroxide solution was added to the sodium aluminate solution. While stirring the mixture, 517.8 g of LUDOX HS-40 was added to the aluminate solution. The mixture was stirred for 30 minutes. The mixture was aged for 18 hours while stirring at room temperature. The mixture was crystallized at 90° C. for 24 hours in a 2 L stainless steel reactor while stirring at 250 RPM. Upon completion of the reaction, the slurry was filtered warm and washed with 2 volumes of water on the filter. After washing, the crystal was dried at 120° C. for 16 hrs. The resulting product was determined to be zeolite RHO via X-ray powder diffraction with crystal sizes of approximately 1 micron or less. Si/Al=2.8, Cs/(Cs+Na)=0.61, (Cs+Na)/Al=1.8 as measured via XRF.

General Embodiments

As discussed, swing adsorption processes may be used to remove water vapor (or simply "water" herein) from a feed stream (such as a gas mixture) because water selectively may adsorb into the micropore of the adsorbent material, and may fill the micropores in certain situations with a greater selectivity than other components of the gas mixture. The swing adsorption processes (e.g., PSA and TSA) may be used to separate gases of a gas mixture because different gases tend to fill the micropore of the adsorbent material to different extents.

As shown in the examples herein, the cationic zeolite RHO materials as disclosed are particularly stable under "wet $CO_2$ environments" or (or equivalently "acid gas environments"). By the term "wet $CO_2$ environments" herein, it is meant gas mixtures containing at least 100 ppmv water and 50 ppmv of $CO_2$ and/or $H_2S$. A preferred form of the cationic zeolite RHO for use in this process is the aluminosilicate form with Na and Cs cations.

The cationic RHO zeolite used in the swing adsorption dehydration process can be in a non-dehydrated form, a dehydrated form, or a calcined form.

For an example related to the dehydration processes herein, if a feeds stream, such as natural gas containing water (or water vapor), is passed under pressure through a vessel containing an adsorbent material that is more selective towards water vapor than it is for methane, at least a portion of the water vapor is selectively adsorbed by the adsorbent material, and the gas exiting the vessel is enriched in methane. As such, the adsorbent would be considered to have a "selectivity" (or "greater selectivity") for water over methane. Before the adsorbent material reaches the end of its capacity to adsorb water vapor it is switched from an adsorption step (or "cycle") to a desorption step. Desorption can be accomplished by raising the temperature of the adsorbent (TSA), purging the adsorbent with a dry stream (PPSA), reducing the pressure of the adsorbent (PSA) or by combinations of these methods. Once the adsorbent has gone through a desorption step it is ready for another adsorption step. Other additional steps such as depressurization, purging, repressurization, or reheating, may alternatively be included in the overall process steps. The combination of the overall steps from the beginning of one adsorption step to the next adsorption step may be referred to as the "total cycle" or the "swing adsorption process cycle".

Rigorous dehydration is the removal of water so that the concentration of water in the product gas or stream (e.g., the gas exiting the adsorbent bed during the adsorption step) to typically less than 10 ppm on a mole basis, preferably less than 1 ppm on a mole basis or even more preferably less than 0.1 ppm on a mole basis.

In performing rapid cycle swing adsorption system, the adsorbent bed (e.g., in one embodiment a substantially parallel channel contactor) is regenerated before the adsorbent material reaches the end of its capacity to adsorb water vapor. PSA processes can be used to regenerate the adsorbent used for dehydration, but sufficient regeneration involves low pressures (e.g., vacuum pressures) and long periods of time for regeneration. For rapid cycle dehydration processes, after the adsorption step, the adsorbent bed will undergo a desorption step wherein a desorption step product is produced (enriched in water) using rapid cycle PSA, rapid cycle TSA and/or rapid cycle PPSA processes, or a combination thereof (e.g., the desorption step may include both a "pressure swing" in combination with a "temperature swing"). After the desorption step, the adsorbent material may be optionally purged, repressurized, and/or cooled prior to the next adsorption step. The adsorbent material is thus prepared for another adsorption cycle.

In particular, is disclosed the cationic zeolite RHO herein may be utilized in pressure swing adsorption processes (PSA), temperature swing adsorption processes (TSA), partial pressure purge swing adsorption (PPSA), rapid temperature swing adsorption (RTSA), rapid cycle pressure absorption (RCPSA), rapid cycle partial pressure swing adsorption (RCPPSA), or a combination thereof, which may be collectively referred to herein as "swing adsorption processes" unless further defined. The term "rapid cycle swing adsorption processes" refer to rapid temperature swing adsorption (RTSA), rapid cycle pressure absorption (RCPSA), rapid cycle partial pressure swing adsorption (RCPPSA), or a combination thereof. The term "rapid cycle swing adsorption processes" will include such processes as mentioned wherein the total cycle time or period for the rapid cycle swing adsorption processes to go through a full cycle, such as feed/product step(s), desorption step(s), purge step(s) and repressurization step(s) and back to the next feed/product step(s), is a period greater than 1 second and less than 600 seconds. In preferred embodiments, total cycle time or period for the rapid cycle swing adsorption processes is greater than 2 seconds and less than 300 seconds. For example, the total cycle times may be less than 600 seconds, less than 300 seconds, preferably less than 200 seconds, more preferably less than 90 seconds, and even more preferably less than 60 seconds. In rapid cycle processes the residence time of the gas contacting the adsorbent material in the adsorbent bed during the adsorption step is typically short.

In rapid cycle swing adsorption processes the residence time of the gas contacting the adsorbent material in the adsorbent bed during the adsorption step is typically short. For rapid cycle swing adsorption processes, the residence time for gas contacting the adsorbent material in the adsorbent bed during the adsorption step is preferably less than 5.0 seconds, more preferably less than 1.0 seconds and even more preferably less than 0.5 seconds. As such, the adsorbent bed unit may be configured to provide a residence time for gas in the gaseous feed stream contacting the adsorbent material during the adsorption step being less than 5.0 seconds, less than 1.0 seconds, and even more preferably less than 0.5 seconds. The rapid cycle swing adsorption system may be configured to provide a product stream (from the adsorption step) having a concentration of water in the product stream is less than 10 parts per million on a mole basis or more preferably less than 1 part per million on a mole basis. In order to meet these stringent requirements, in a preferred embodiment a parallel channel contactor may be utilized as the contactor's adsorbent bed. However it should be noted that the present invention is applicable to all types of swing adsorption contactor configurations. Non-limiting examples of other types of contactors are packed bed contactors.

Substantially parallel channel contactors can be constructed by coating thin layers of the cationic zeolite RHO and a binder onto a monolith. Substantially parallel channel contactors, such as monoliths, provide very low pressure drop as compared to conventional pellet or other packed beds, which provides a mechanism for the economic use of significantly higher gas velocities and hence higher productivity. One of the primary factors to the performance of a substantially parallel channel contactor and its application for rapid cycle swing adsorption systems is to avoid or minimize mass transfer resistances, and thus allow the intrinsic speed of the primary adsorbent to operate in the kinetic adsorption regime. Avoidance of mass transfer resistances in rapid cycle contactors provide the conditions to facilitate the generation of sharp adsorption fronts, particularly for strong Type 1 isotherm adsorption systems, such as water, in the adsorbent material. Sharp fronts within the length of the contactor provide efficient adsorbate removal to very low concentrations.

Minimization of mass transfer resistance may be accomplished in a substantially parallel channel contactor by several steps. Gas film transfer resistance is minimized by making the gas channels in the contactor of small diameter, such that the distance any adsorbate species has to diffuse in the gas phase is limited to one half the diameter of the gas channel Gas channel diameters, or heights, of less than 2 millimeters are preferred, less than 1 millimeter are more preferred, and less than 600 microns are most preferred. Secondly, limiting the thickness of adsorbate containing coatings reduces the distance that adsorbate species has to diffuse through the macropores and mesopores of the composited adsorbate coating. Preferably, the volume of the zeolite 3A or other molecular sieve is greater than that of the binder and thickness of the layer is less than 800 microns, preferably less than 200 microns and even more preferably less than 125 microns, most preferably less than 60 microns. Further, it is beneficial to minimize the amount of mesopores within the coating layer, with a predominance of macropores being preferred due to the faster diffusion speeds of gas species in macropores as compared to mesopores. It is preferred that at least 50% of the pore volume of the adsorbate coating layer is in macropores, i.e. pore diameters greater than 50 nanometers, more preferably at least 75%, and most preferably greater than 90%. Lastly, adsorbent coating layers with low intrinsic tortuosity are preferred.

While not limiting, suitable contactors may be constructed of adsorbate coatings on ceramic monoliths, or spaced laminated support sheets of metal, metal mesh, polymer, or polymer mesh, or various screens when laminated and spaced with spacers or other means to provide a gas flow channel parallel to the coating layers. Corrugated metal sheets, either layered or spiral wound coated with an adsorbent layer are particularly useful and flexible in their possible designs and gas channel characteristics. Contactors constructed from multiple monoliths or other such structures stacked in series are also particularly useful, as spaces between the monoliths or such provide gas mixing and can minimize front dispersion caused by variations in adsorbate coating thicknesses or gas channel diameters.

Included herein is a process for removing water from a gaseous feed stream, the process comprising performing a swing adsorption process by:

a) performing an adsorption step, wherein the adsorption step comprises passing a feed stream comprising water through an adsorbent bed unit comprising at least one adsorbent bed wherein water is selectively separated from the feed stream to form a product stream which has a lower molar fraction of water than the feed stream, wherein the adsorbent bed comprises an adsorbent material which is a cationic zeolite RHO;

b) interrupting the flow of the gaseous feed stream;

c) performing a desorption step, wherein the desorption step comprises removing at least a portion of the water from the adsorbent material; and d) repeating the steps a) to c) for at least one additional cycle.

In preferred embodiments, the gaseous feed stream comprises from 0.00001 to 0.3 bar of water ($H_2O$) partial pressure, and from 0.005 to 3.0 bar of carbon dioxide ($CO_2$) partial pressure. In preferred embodiments, the water uptake capacity of the cationic RHO zeolite after 3000 cycles is preferably at least 80%, more preferably at least 90%, and even more preferably at least 95% of the initial water uptake capacity of the cationic RHO zeolite. In preferred embodiments, this stability initial water uptake capacity of the cationic RHO zeolite after 3000 cycles is based on utilization in a rapid cycle temperature swing adsorption process wherein the temperature difference between the adsorption step and the desorption step is at least 100° C.; more preferably at least 150° C., and/or when the desorption temperature is at least 150° C., at least 200° C., or at least 250° C.

As further enhancements, the process may include some additional variations to the process. For example, the rapid cycle swing adsorption process may comprise a rapid cycle pressure swing adsorption process, a rapid cycle temperature swing adsorption process, a rapid cycle partial pressure swing adsorption process, or any combination thereof; the desorption step may further comprise performing a purge step, wherein the purge step comprises passing a purge stream into the adsorbent bed unit to remove at least a portion of the water from the substantially parallel channel contactor to form a purge product stream; the rapid cycle swing adsorption process may comprise a rapid cycle pressure swing adsorption process; may include performing one or more depressurization steps after step b) and prior to step c), wherein the pressure within the adsorbent bed unit is reduced by a predetermined amount with each successive depressurization step; may include heating the substantially parallel channel contactor to promote the removal of at least a portion of the water from the substantially parallel channel contactor to form a purge product stream; and may include passing a heated purge stream through the substantially parallel channel contactor to promote the removal of at least a portion of the water from the substantially parallel channel contactor to form a purge product stream. The pressure of the feed stream may be in the range between 400 pounds per square inch absolute (psia) and 1500 psia, or in the range from 600 psia to 1200 psi.; wherein the gaseous feed stream may be a hydrocarbon containing stream having greater than one volume percent hydrocarbons based on the total volume of the feed stream; wherein the cycle duration is greater than 2 seconds and less than 300 seconds; wherein residence time for gas in the gaseous feed stream contacting the adsorbent material in the substantially parallel channel contactor during the adsorption step is less than 5.0 seconds, is less than 1.0 seconds or is less than 0.5 seconds; and/or wherein the concentration of water in the product stream is less than 50 parts per million on a mole basis, is less than 1 parts per million on a mole basis or is less than 0.1 parts per million on a mole basis.

The present techniques involve one or more adsorbent bed units to perform a swing adsorption process or groups of adsorbent bed units configured to perform a series of swing adsorption processes. Each adsorbent bed unit may be configured to perform a specific cycle or cycles, which may include an adsorption step and a desorption step. As noted, additional steps may be further included.

In certain configurations, the swing adsorption unit, which includes the adsorbent material, may process a feed stream that comprises hydrocarbons along with water and $CO_2$. For example, the feed stream may be a hydrocarbon containing stream having greater than one volume percent hydrocarbons based on the total volume of the feed stream. By way of example, the stream may include $H_2O$ and $CO_2$ as one or more contaminants and the gaseous feed stream may comprise $H_2O$ in the range of 10 parts per million (ppm) molar to 1,500 ppm molar; or in the range of 500 ppm to 1,500 ppm molar; and $CO_2$ in the range of 50 parts per million (ppm) molar to 2 molar %; or in the range of 500 ppm to 2 molar %. Moreover, the feed stream may include hydrocarbons and $H_2O$, wherein the $H_2O$ is one of the one or more contaminants and the feed stream comprises $H_2O$ in the range of two ppm molar to saturation levels in the feed stream.

In certain configurations, the adsorbent material may be used in a rapid cycle swing adsorption process, such as a rapid cycle PSA process, to remove moisture from the feed stream. The specific level may be related to dew point of desired output product (e.g., the water content should be lower than the water content required to obtain a dew point below the lowest temperature of the stream in subsequent processing and is related to the feed pressure). As a first approximation, and not accounting for fugacity corrections as a function of pressure, the water concentration in ppm that yields a certain dew point varies inversely with the pressure. For example, the output stream from the adsorbent bed may be configured to be the cryogenic processing feed stream, which satisfies the cryogenic processing specifications (e.g., approximately −150° F. (−101.1° C.) dew point for NGL processes or approximately −60° F. (−51.1° C.) for Controlled Freeze Zone (CFZ) processes. The cryogenic processing feed stream specification may include a water content in the stream (e.g., output stream from the adsorbent bed or feed stream to the to be cryogenic processing) to be in the range between 0.0 ppm and 10 ppm, in the range between 0.0 ppm and 5.0 ppm, in the range between 0.0 ppm and 2.0 ppm, or in the range between 0.0 ppm and 1.0 ppm. The resulting output stream from the adsorbent beds during the purge step may include a water content in the stream to be in the range between 0.0 ppm and 7 pounds per standard cubic feet (lb/MSCF).

In one or more embodiments, the present techniques can be used for any type of swing adsorption process. Non-limiting swing adsorption processes for which the present techniques may include pressure swing adsorption (PSA), vacuum pressure swing adsorption (VPSA), temperature swing adsorption (TSA), partial pressure purge swing adsorption (PPPSA), rapid cycle pressure swing adsorption (RCPSA), rapid cycle thermal swing adsorption (RCTSA), rapid cycle partial pressure swing adsorption (RCPPSA), as well as combinations of these processes, such as pressure and/or temperature swing adsorption. Exemplary swing adsorption processes are described in U.S. Patent Application Publication Nos. 2008/0282892, 2008/0282887, 2008/0282886, 2008/0282885, 2008/0282884 and 2014/0013955 and U.S. Ser. Nos. 15/233,617; 15/233,623; 15/233,631 and 16/233,640, which are each herein incorporated by reference in their entirety.

Further, in certain configurations of the system, the present techniques may include a specific process flow to remove contaminants, such as water ($H_2O$), in the swing adsorption system. For example, the process may include an adsorbent step and a desorption step, which form the cycle. The adsorbent step may include passing a feed stream at a feed pressure and feed temperature through an adsorbent bed unit having an adsorbent material (e.g., adsorbent bed or substantially parallel channel contactor) to separate one or more contaminants from the feed stream to form a product stream. The feed stream may be passed through the substantially parallel channel contactor in a forward direction (e.g., from the feed end of the substantially parallel channel contactor to the product end of the substantially parallel channel contactor). Then, the flow of the feed stream may be interrupted for a regeneration step. The regeneration step may include one or more depressurization steps, one or more purge steps and/or one or more re-pressurization steps. The depressurization steps may include reducing the pressure of the adsorbent bed unit by a predetermined amount for each successive depressurization step, which may be a single step and/or may be a blowdown step. The depressurization step may be provided in a forward direction or may preferably be provided in a countercurrent direction (e.g., from the product end of the substantially parallel channel contactor to the feed end of the substantially parallel channel contactor). The purge step may include passing a purge stream into the adsorbent bed unit, which may be a once through purge step and the purge stream may be provided in countercurrent flow relative to the feed stream. The purge product stream from the purge step may be conducted away and recycled to another system or in the system. Then, the one or more re-pressurization steps may be performed, wherein the pressure within the adsorbent bed unit is increased with each re-pressurization step by a predetermined amount with each successive re-pressurization step.

Additionally included herein is a swing adsorption system for removing water from a feed stream, the system comprising:
  a) at least one adsorbent contactor containing an adsorbent bed;
  b) a feed stream inlet fluidly connected to the at least one adsorbent contactor; and
  c) a product stream outlet fluidly connected to the at least one adsorbent contactor;
  wherein the adsorbent bed comprises an adsorbent material which is a cationic zeolite RHO.

In preferred embodiments, the adsorbent bed is a parallel channel contactor. In other preferred embodiments, the swing adsorption system is configured to perform steps comprising:
  a) perform an adsorption step, wherein the adsorption step comprises passing a feed stream comprising water through the adsorbent bed to form a product stream;
  b) interrupting the flow of the feed stream;
  c) performing a desorption step, wherein the desorption step comprises removing at least a portion of the water from the adsorbent material; and
  d) repeating the steps a) to c) for at least one additional cycle.

Also, the present techniques may be integrated into a various configurations, which may include a variety of compositions for the streams. Adsorptive separation processes, apparatus, and systems, as described above, are useful for development and production of hydrocarbons, such as gas and oil processing.

These rapid cycle swing adsorption processes provide enhancements of using less adsorbent, reducing size of equipment to have less capital cost and foot print. In addition, the rapid cycle swing adsorption processes make possible a mobile system to be used in remote areas, offshore, and other hard to reach places.

Other Embodiments

Herein listed are non-limiting embodiments of the invention as disclosed.

Embodiment 1. A process for removing water from a feed stream, the process comprising performing a swing adsorption process by:
 a) performing an adsorption step, wherein the adsorption step comprises passing a feed stream comprising water through an adsorbent bed unit comprising at least one adsorbent bed wherein water is selectively separated from the feed stream to form a product stream which has a lower molar fraction of water than the feed stream, wherein the adsorbent bed comprises an adsorbent material which is a cationic zeolite RHO comprising at least one metal cation;
 b) interrupting the flow of the feed stream;
 c) performing a desorption step, wherein the desorption step comprises removing at least a portion of the water from the adsorbent material; and
 d) repeating the steps a) to c) for at least one additional cycle.

Embodiment 2. The process of Embodiment 1, wherein the cationic zeolite RHO is a RHO framework zeolite comprising at least one metal cation selected from the Group 1 and Group 2 elements (new Group 1-18 IUPAC numbering), and the ratio of average atomic metal cation charge to the atomic Al plus Ga content in the crystal as measured by either XRF or AA/ICP is from 0.7 (atomic charges per atom) to 1.5 (atomic charges per atom).

Embodiment 3. The process of any one of Embodiments 1-2, wherein the cationic zeolite RHO comprises an aluminosilicate, a gallosilicate, or a combination thereof.

Embodiment 4. The process of any one of Embodiments 1-3, wherein the at least one metal cation is selected from Li, Na, K, Rb, Cs, Mg, Ca, Sr, and Ba.

Embodiment 5. The process of Embodiment 4, wherein the at least one metal cation is selected from Li, Na, K, and Cs.

Embodiment 6. The process of Embodiment 5, wherein the at least one metal cation is Cs.

Embodiment 7. The process of any one of Embodiments 1-3, wherein the cationic zeolite RHO comprises at least two metal cations selected from Li, Na, K, Rb, Cs, Mg, Ca, Sr, and Ba.

Embodiment 8. The process of Embodiment 7, wherein one of the at least two metal cations is Cs.

Embodiment 9. The process of any one of Embodiments 1-3, wherein the cationic zeolite RHO comprises at least two metal cations selected from NaCs, KCs, and LiCs.

Embodiment 10. The process of any one of Embodiments 1-9, wherein the cationic zeolite RHO further comprises a non-metallic cation selected from $H^+$, $NH_4^+$, and a combination thereof.

Embodiment 11. The process of Embodiment 10, wherein the cationic zeolite RHO comprises an aluminosilicate and the cationic zeolite RHO has a ratio of the average non-metallic cation charge to the atomic Al plus Ga content is less than 0.3 (atomic charges per atom).

Embodiment 12. The process of any one of Embodiments 1-11, wherein the feed stream is air.

Embodiment 13. The process of any one of Embodiments 1-11, wherein the feed stream comprises hydrocarbons.

Embodiment 14. The process of Embodiment 13, wherein the feed stream further comprises an acid gas.

Embodiment 15. The process of any one of Embodiments 1-14, wherein the water content of the feed stream is at least about 100 ppm mole fraction and the water content of the product stream is less than about 10 ppm mole fraction.

Embodiment 16. The process of any one of Embodiments 13-15, wherein the product stream comprises at least 90 wt % of the hydrocarbons present in the feed stream.

Embodiment 17. The process of any one of Embodiments 13-16, wherein the feed stream is natural gas.

Embodiment 18. The process of any one of Embodiments 1-17, wherein the cationic zeolite RHO is NaCs—RHO.

Embodiment 19. The process of any one of Embodiments 1-18, wherein the swing adsorption process is selected from TSA, PSA, PPSA, VPSA, and combinations thereof.

Embodiment 20. The process of any one of Embodiments 1-19, wherein the cationic zeolite RHO is in a non-dehydrated form.

Embodiment 21. The process of any one of Embodiments 1-19, wherein the cationic zeolite RHO is in a dehydrated form.

Embodiment 22. The process of any one of Embodiments 1-19, wherein the cationic zeolite RHO is in a calcined form.

Embodiment 23. The process of any one of Embodiments 1-22, the feed stream is in a gaseous state.

Embodiment 24. A swing adsorption system for removing water from a feed stream, the system comprising:
 a) at least one adsorbent contactor containing an adsorbent bed;
 b) a feed stream inlet fluidly connected to the at least one adsorbent contactor; and
 c) a product stream outlet fluidly connected to the at least one adsorbent contactor;
 wherein the adsorbent bed comprises an adsorbent material which is a cationic zeolite RHO comprising at least one metal cation.

Embodiment 25. The system of Embodiment 24, wherein the adsorbent bed is a parallel channel contactor.

Embodiment 26. The system of any one of Embodiments 24-25, wherein the mass of cationic zeolite RHO in the adsorbent bed is more than 20 wt % of the total materials making up the adsorbent bed.

Embodiment 27. The system of any one of Embodiments 24-26, wherein the swing adsorption system is configured to perform steps comprising:
 a) perform an adsorption step, wherein the adsorption step comprises passing a feed stream comprising water through the adsorbent bed to form a product stream;
 b) interrupting the flow of the feed stream;
 c) performing a desorption step, wherein the desorption step comprises removing at least a portion of the water from the adsorbent material; and
 d) repeating the steps a) to c) for at least one additional cycle.

Embodiment 28. The system of any one of Embodiments 24-27, wherein the cationic zeolite RHO is a RHO framework zeolite comprising at least one metal cation selected from the Group 1 and Group 2 elements (new Group 1-18 IUPAC numbering), and the ratio of average atomic metal cation charge to the atomic Al plus Ga content in the crystal as measured by either XRF or AA/ICP is from 0.7 (atomic charges per atom) to 1.5 (atomic charges per atom).

Embodiment 29. The system of any one of Embodiments 24-28, wherein the cationic zeolite RHO comprises an aluminosilicate, a gallosilicate, or a combination thereof.

Embodiment 30. The system of any one of Embodiments 24-29, wherein the at least one metal cation is selected from Li, Na, K, Rb, Cs, Mg, Ca, Sr, and Ba.

Embodiment 31. The system of Embodiment 30, wherein the at least one metal cation is selected from Li, Na, K, and Cs.

Embodiment 32. The system of Embodiment 31, wherein the at least one metal cation is Cs.

Embodiment 33. The system of any one of Embodiments 24-29, wherein the cationic zeolite RHO comprises at least two metal cations selected from Li, Na, K, Rb, Cs, Mg, Ca, Sr, and Ba.

Embodiment 34. The system of Embodiment 33, wherein one of the at least two metal cations is Cs.

Embodiment 35. The system of any one of Embodiments 24-29, wherein the cationic zeolite RHO comprises at least two metal cations selected from NaCs, KCs, and LiCs.

Embodiment 36. The system of any one of Embodiments 24-35, wherein the cationic zeolite RHO further comprises a non-metallic cation selected from $H^+$, $NH4^+$, and a combination thereof.

Embodiment 37. The system of Embodiment 36, wherein the cationic zeolite RHO comprises an aluminosilicate and the cationic zeolite RHO has a ratio of the average non-metallic cation charge to the atomic Al plus Ga content is less than 0.3 (atomic charges per atom).

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

The invention claimed is:

1. A process for removing water from a feed stream, the process comprising performing a swing adsorption process by:
   a) performing an adsorption step, wherein the adsorption step comprises passing a feed stream comprising water through an adsorbent bed unit comprising at least one adsorbent bed wherein water is selectively separated from the feed stream to form a product stream which has a lower molar fraction of water than the feed stream, wherein the adsorbent bed comprises an adsorbent material which is a cationic zeolite RHO comprising at least one metal cation;
   b) interrupting the flow of the feed stream;
   c) performing a desorption step, wherein the desorption step comprises removing at least a portion of the water from the adsorbent material; and
   d) repeating the steps a) to c) for at least one additional cycle.

2. The process of claim 1, wherein the cationic zeolite RHO is a RHO framework zeolite comprising at least one metal cation selected from the Group 1 and Group 2 elements (new Group 1-18 IUPAC numbering), and the ratio of average atomic metal cation charge to the atomic Al plus Ga content in the crystal as measured by either XRF or AA/ICP is from 0.7 (atomic charges per atom) to 1.5 (atomic charges per atom).

3. The process of claim 2, wherein the cationic zeolite RHO comprises an aluminosilicate, a gallosilicate, or a combination thereof.

4. The process of claim 1, wherein the at least one metal cation is selected from Li, Na, K, Rb, Cs, Mg, Ca, Sr, and Ba.

5. The process of claim 4, wherein the at least one metal cation is Cs.

6. The process of claim 1, wherein the cationic zeolite RHO comprises at least two metal cations selected from Li, Na, K, Rb, Cs, Mg, Ca, Sr, and Ba.

7. The process of claim 6, wherein one of the at least two metal cations is Cs.

8. The process of claim 1, wherein the cationic zeolite RHO comprises at least two metal cations selected from NaCs, KCs, and LiCs.

9. The process of claim 1, wherein the cationic zeolite RHO further comprises a non-metallic cation selected from $H^+$, $NH4^+$, and a combination thereof.

10. The process of claim 9, wherein the cationic zeolite RHO comprises an aluminosilicate and the cationic zeolite RHO has a ratio of the average non-metallic cation charge to the atomic Al plus Ga content is less than 0.3 (atomic charges per atom).

11. The process of claim 1, wherein the feed stream is air.

12. The process of claim 11, wherein the cationic zeolite RHO is NaCs—RHO.

13. The process of claim 1, wherein the feed stream comprises hydrocarbons.

14. The process of claim 13, wherein the feed stream further comprises an acid gas.

15. The process of claim 14, wherein the cationic zeolite RHO is NaCs—RHO.

16. The process of claim 15, wherein the water content of the feed stream is at least about 100 parts per million (ppm)

mole fraction and the water content of the product stream is less than about 10 ppm mole fraction.

17. The process of claim 16, wherein the product stream comprises at least 90 wt % of the hydrocarbons present in the feed stream.

18. The process of claim 17, wherein the feed stream is natural gas.

19. A swing adsorption system for removing water from a feed stream, the system comprising:
 a) at least one adsorbent contactor containing an adsorbent bed;
 b) a feed stream inlet fluidly connected to the at least one adsorbent contactor; and
 c) a product stream outlet fluidly connected to the at least one adsorbent contactor;
 wherein the adsorbent bed comprises an adsorbent material which is a cationic zeolite RHO comprising at least one metal cation.

20. The system of claim 19, wherein the adsorbent bed is a parallel channel contactor.

21. The system of claim 19, wherein the mass of cationic zeolite RHO in the adsorbent bed is more than 20 wt % of the total materials making up the adsorbent bed.

22. The system of claim 19, wherein the swing adsorption system is configured to perform steps comprising:
 a) perform an adsorption step, wherein the adsorption step comprises passing a feed stream comprising water through the adsorbent bed to form a product stream;
 b) interrupting the flow of the feed stream;
 c) performing a desorption step, wherein the desorption step comprises removing at least a portion of the water from the adsorbent material; and
 d) repeating the steps a) to c) for at least one additional cycle.

23. The system of claim 19, wherein the cationic zeolite RHO is a RHO framework zeolite comprising at least one metal cation selected from the Group 1 and Group 2 elements (new Group 1-18 IUPAC numbering), and the ratio of average atomic metal cation charge to the atomic Al plus Ga content in the crystal as measured by either XRF or AA/ICP is from 0.7 (atomic charges per atom) to 1.5 (atomic charges per atom), and the cationic zeolite RHO comprises an aluminosilicate, a gallosilicate, or a combination thereof.

24. The system of claim 23, wherein the at least one metal cation is selected from Li, Na, K, Rb, Cs, Mg, Ca, Sr, and Ba.

25. The system of claim 24, wherein the at least one metal cation is Cs.

26. The system of claim 23, wherein the cationic zeolite RHO comprises at least two metal cations selected from Li, Na, K, Rb, Cs, Mg, Ca, Sr, and Ba.

27. The system of claim 26, wherein one of the at least two metal cations is Cs.

28. The system of claim 23, wherein the cationic zeolite RHO comprises at least two metal cations selected from NaCs, KCs, and LiCs.

29. The system of claim 23, wherein the cationic zeolite RHO further comprises a non-metallic cation selected from $H^+$, $NH4^+$, and a combination thereof.

30. The system of claim 29, wherein the cationic zeolite RHO comprises an aluminosilicate and the cationic zeolite RHO has a ratio of the average non-metallic cation charge to the atomic Al plus Ga content is less than 0.3 (atomic charges per atom).

* * * * *